US009131004B2

(12) United States Patent
Carley

(10) Patent No.: US 9,131,004 B2
(45) Date of Patent: Sep. 8, 2015

(54) METHOD AND APPARATUS FOR NETWORK ADDRESS RESOLUTION

(76) Inventor: Jeffrey Alan Carley, Colorado Springs, CO (US)

( * ) Notice: Subject to any disclaimer, the term of this patent is extended or adjusted under 35 U.S.C. 154(b) by 826 days.

(21) Appl. No.: 12/767,781

(22) Filed: Apr. 26, 2010

(65) Prior Publication Data

US 2012/0089714 A1  Apr. 12, 2012

Related U.S. Application Data

(60) Provisional application No. 61/172,778, filed on Apr. 26, 2009.

(51) Int. Cl.
*G06F 15/173* (2006.01)
*G06F 15/16* (2006.01)
*H04L 29/06* (2006.01)
*H04L 29/12* (2006.01)
*H04L 29/08* (2006.01)

(52) U.S. Cl.
CPC ............... *H04L 69/28* (2013.01); *H04L 61/103* (2013.01); *H04L 61/6009* (2013.01); *H04L 67/2852* (2013.01)

(58) Field of Classification Search
CPC .............. H04L 61/103; H04L 61/6009; H04L 67/2852
USPC ........................... 709/223, 226, 228, 246, 24
See application file for complete search history.

(56) References Cited

U.S. PATENT DOCUMENTS

| | | | |
|---|---|---|---|
| 6,173,361 B1* | 1/2001 | Taketa | 711/113 |
| 6,449,692 B1* | 9/2002 | Krueger et al. | 711/122 |
| 6,640,286 B2* | 10/2003 | Kawamoto et al. | 711/133 |
| 7,287,136 B2* | 10/2007 | Miyauchi | 711/160 |
| 7,304,955 B2* | 12/2007 | Lee | 370/237 |
| 7,474,660 B1* | 1/2009 | Pearce et al. | 370/395.3 |
| 7,840,293 B2* | 11/2010 | Weinrich et al. | 700/95 |
| 2004/0190477 A1* | 9/2004 | Olson et al. | 370/338 |
| 2006/0268851 A1* | 11/2006 | Baratakke et al. | 370/389 |
| 2007/0093918 A1* | 4/2007 | Blevins et al. | 700/20 |
| 2008/0101381 A1* | 5/2008 | Sun et al. | 370/395.54 |
| 2009/0204753 A1* | 8/2009 | Bridge et al. | 711/106 |
| 2010/0106791 A1* | 4/2010 | Dai et al. | 709/206 |
| 2010/0228879 A1* | 9/2010 | Wiget et al. | 709/238 |
| 2011/0161665 A1* | 6/2011 | Perez | 713/161 |

* cited by examiner

Primary Examiner — Jude Jean Gilles

(57) ABSTRACT

Methods and mechanisms to improve ARP cache management and to better facilitate receive load balancing on systems with multiple communications interfaces connected to a broadcast domain.

7 Claims, 29 Drawing Sheets

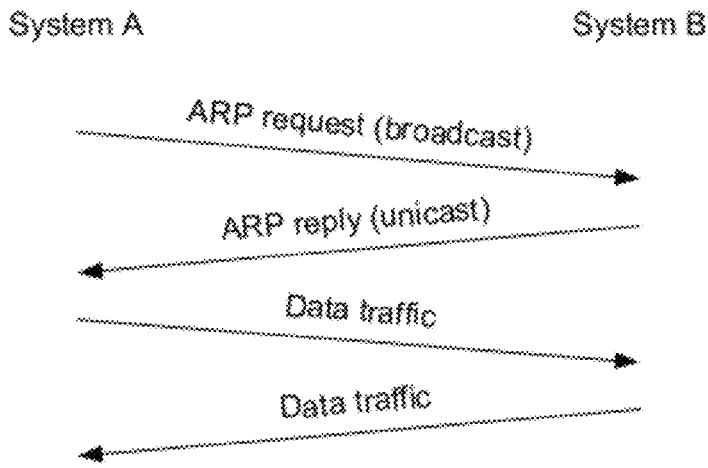

FIG. 1 (Prior Art)

ARP Request

| Fields | Values |
|---|---|
| Hardware Type | Depends on Physical Media |
| Protocol Type | 2048 for IPv4 |
| Hardware Address Length | 6 for IEEE 802 MAC addresses |
| Protocol Address Length | 4 for IPv4 addresses |
| Opcode | 1 for ARP request |
| Sender Hardware Address | HA of message sender |
| Sender Protocol Address | PA of message sender |
| Target Hardware Address | should be ignored |
| Target Protocol Address | PA of message target |

FIG. 2 (Prior Art)

ARP Reply

| Fields | Values |
|---|---|
| Hardware Type | Depends on Physical Media |
| Protocol Type | 2048 for IPv4 |
| Hardware Address Length | 6 for IEEE 802 MAC addresses |
| Protocol Address Length | 4 for IPv4 addresses |
| Opcode | 2 for ARP reply |
| Sender Hardware Address | HA of message sender |
| Sender Protocol Address | PA of message sender |
| Target Hardware Address | HA of message target |
| Target Protocol Address | PA of message target |

FIG. 3 (Prior Art)

| Protocol | VLAN | Protocol Address | Hardware Address | Expire Time |
|---|---|---|---|---|
| | | | | |
| | | | | |
FIG. 4 (Prior Art)
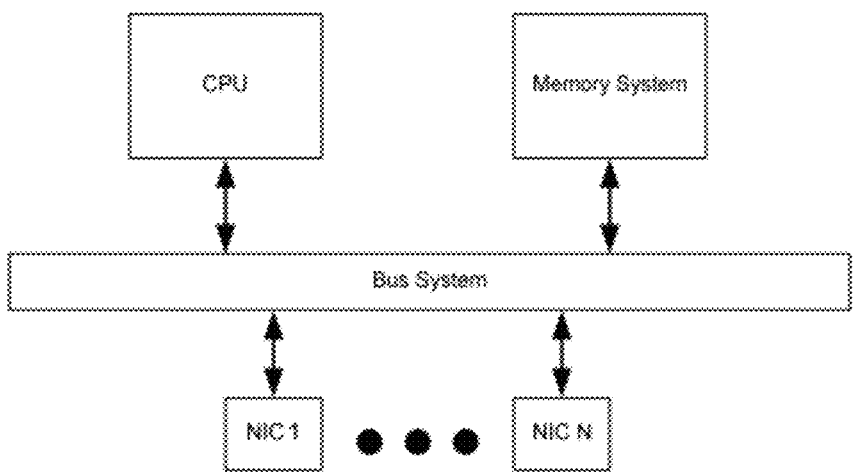
FIG. 5
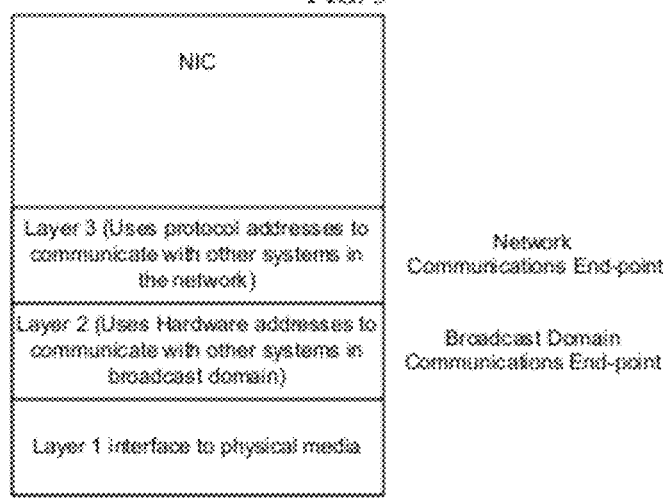
FIG. 6

| Protocol | VLAN | PA | HA | Max Idle Time | Expire Time | Refresh Time | Last Access Time | Status |
|---|---|---|---|---|---|---|---|---|
| | | | | | | | | |
| | | | | | | | | |
| | | | | | | | | |
| | | | | | | | | |
| | | | | | | | | |
| | | | | | | | | |

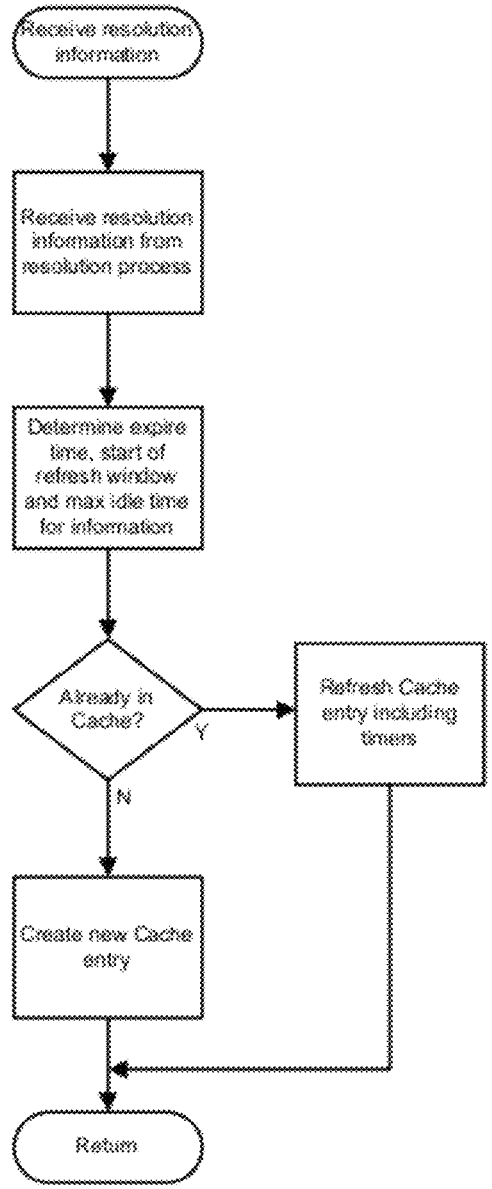
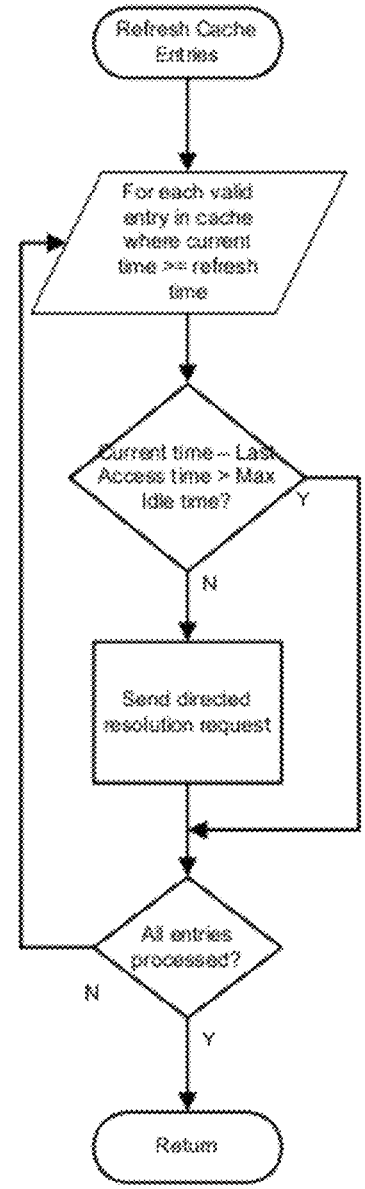
FIG. 9
FIG. 12

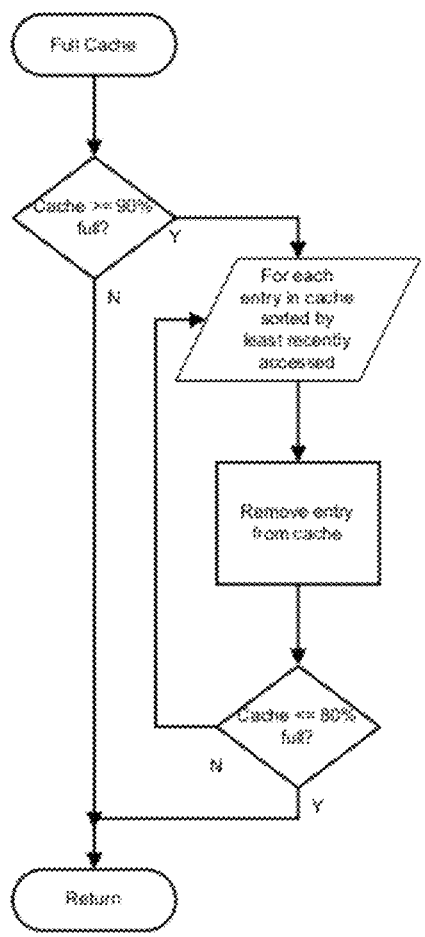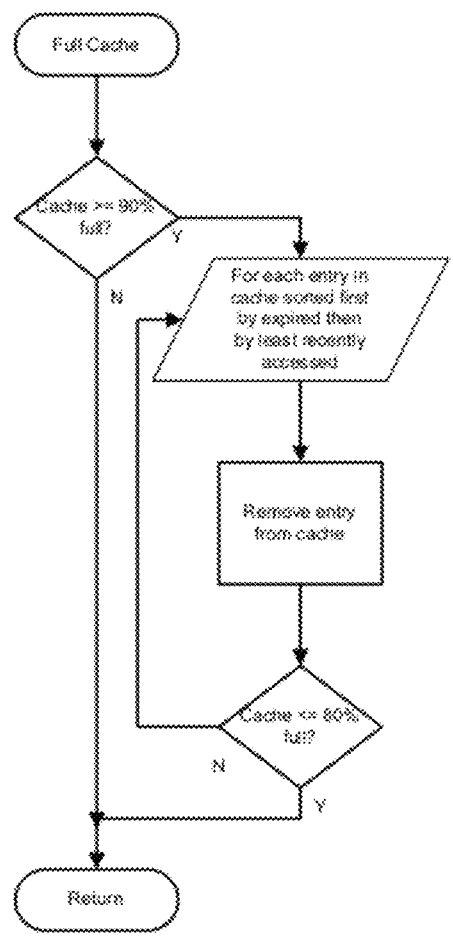
FIG. 11A                    FIG. 11B

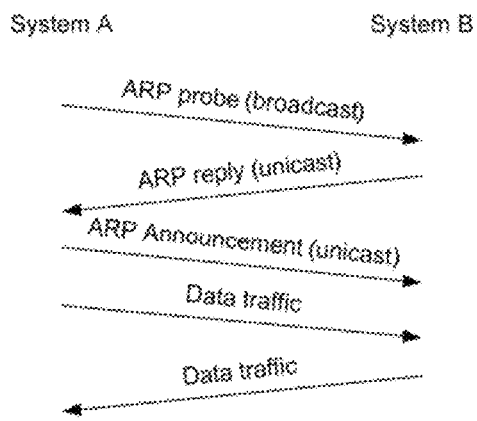

FIG. 13

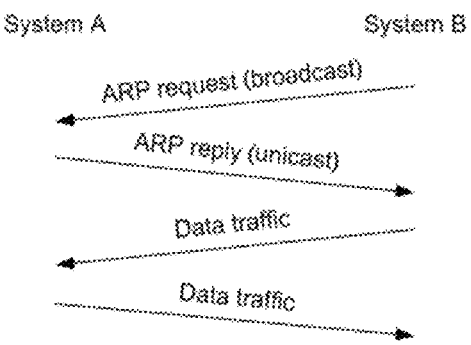

FIG. 17

ARP Probe

| Fields | Values |
|---|---|
| Hardware Type | Depends on Physical Media |
| Protocol Type | 2048 for IPv4 |
| Hardware Address Length | 6 for IEEE 802 MAC |
| Protocol Address Length | 4 for IPv4 addresses |
| Opcode | 1 for ARP request |
| Sender Hardware Address | HA of message sender |
| Sender Protocol Address | zeros |
| Target Hardware Address | should be ignored |
| Target Protocol Address | PA of message target |

FIG. 14

ARP Reply B

| Fields | Values |
|---|---|
| Hardware Type | Depends on Physical Media |
| Protocol Type | 2048 for IPv4 |
| Hardware Address Length | 6 for IEEE 802 MAC |
| Protocol Address Length | 4 for IPv4 addresses |
| Opcode | 2 for ARP reply |
| Sender Hardware Address | HA of message sender |
| Sender Protocol Address | PA of message sender |
| Target Hardware Address | HA of message target |
| Target Protocol Address | zeros |

FIG. 15

ARP Announce A

| Fields | Values |
|---|---|
| Hardware Type | Depends on Physical Media |
| Protocol Type | 2048 for IPv4 |
| Hardware Address Length | 6 for IEEE 802 MAC |
| Protocol Address Length | 4 for IPv4 addresses |
| Opcode | 2 for ARP reply |
| Sender Hardware Address | HA of message sender |
| Sender Protocol Address | PA of message sender |
| Target Hardware Address | HA of message target |
| Target Protocol Address | PA of message target |

FIG. 16A

ARP Announce B

| Fields | Values |
|---|---|
| Hardware Type | Depends on Physical Media |
| Protocol Type | 2048 for IPv4 |
| Hardware Address Length | 6 for IEEE 802 MAC |
| Protocol Address Length | 4 for IPv4 addresses |
| Opcode | 1 for ARP request |
| Sender Hardware Address | HA of message sender |
| Sender Protocol Address | PA of message sender |
| Target Hardware Address | zeros or HA of message sender |
| Target Protocol Address | zeros or PA of message sender |

FIG. 16B

Extended ARP Reply for IEEE 802 MAC and
Extended ARP Announce for IEEE 802 MAC

| Fields | Values |
|---|---|
| Hardware Type | Depends on Physical Media |
| Protocol Type | 2048 for IPv4 |
| Hardware Address Length | N * 6 |
| Protocol Address Length | 4 for IPv4 addresses |
| Opcode | X for Extended ARP reply for 802 |
| Sender Hardware Address | List of N HA of message sender |
| Sender Protocol Address | PA of message sender |
| Target Hardware Address | HA of message target + 0 |
| Target Protocol Address | PA of message target |

FIG. 18

| Group Boolean | System ID | Group ID | Group Algorithm |
|---|---|---|---|
|  |  |  |  |
|  |  |  |  |
|  |  |  |  |
|  |  |  |  |
|  |  |  |  |

FIG. 19A

| System ID | Group ID | Interface Key | Hardware Address |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |

FIG. 19B

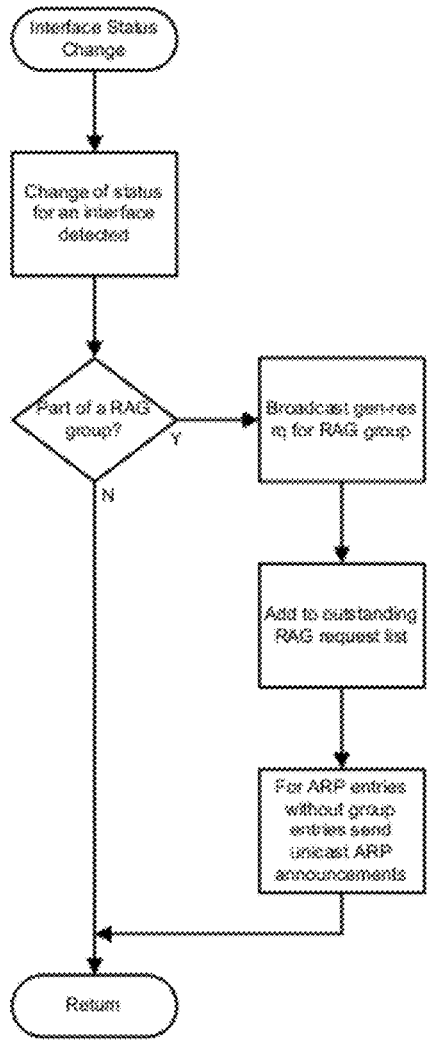
FIG. 42
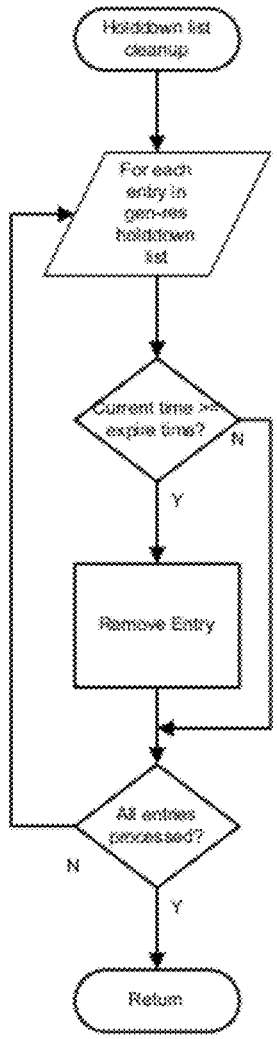
FIG. 43
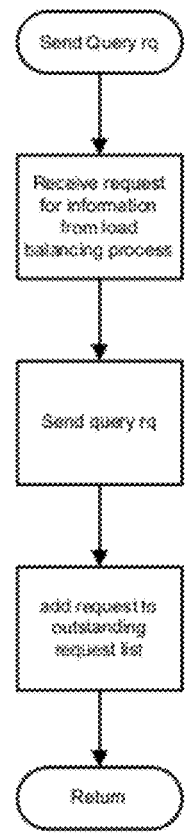
FIG. 44
System Identifier
| Fields | Values |
| --- | --- |
| Parameter Type Identifier | 1 for System ID |
| Length | Length of remainder of TLV parameter in bytes |
| Global Unique ID | Network Unique System Identifier |
FIG. 45

Hardware Type

| Fields | Values |
|---|---|
| Parameter Type Identifier | 2 for Hardware Type |
| Length | Length of remainder of TLV parameter in bytes |
| Hardware Type | 1 for Ethernet |

FIG. 46

Protocol Type

| Fields | Values |
|---|---|
| Parameter Type Identifier | 3 for Protocol Type |
| Length | Length of remainder of TLV parameter in bytes |
| Protocol Type | 2048 for IPv4 |

FIG. 47

Group ID

| Fields | Values |
|---|---|
| Parameter Type Identifier | 4 for Group ID |
| Length | Length of remainder of TLV parameter in bytes |
| System Unique ID | System Unique Group Identifier |

FIG. 48

Requested Group Algorithm

| Fields | Values |
|---|---|
| Parameter Type Identifier | 5 for Requested Group Algorithm |
| Length | Length of remainder of TLV parameter in bytes |
| Algorithm ID | Identifier for Group Algorithm to be used |

FIG. 49

Set Group Algorithm

| Fields | Values |
|---|---|
| Parameter Type Identifier | 6 for SetGroup Algorithm |
| Length | Length of remainder of TLV parameter in bytes |
| Algorithm ID | Identifier for Group Algorithm to be used |

FIG. 50

Cache Time

| Fields | Values |
|---|---|
| Parameter Type Identifier | 7 for Cache Time |
| Length | Length of remainder of TLV parameter in bytes |
| Duration of Time | Cache Time - meaning depends upon message |

FIG. 51

Receiver Protocol Addresses

| Fields | Values |
|---|---|
| Parameter Type Identifier | 10 for Receiver protocol Addresses |
| Length | Length of remainder of TLV |
| Number of addresses | Number of addresses in TLV |
| Length of each address | Length of each address in TLV |
| Address | 1st address in TLV |
| ... | |
| Address | Nth address in TLV |

FIG. 52

Receiver Hardware Addresses

| Fields | Values |
|---|---|
| Parameter Type Identifier | 11 for Receiver Hardware Addresses |
| Length | Length of remainder of TLV |
| Number of addresses | Number of addresses in TLV |
| Length of each address | Length of each address in TLV |
| Address | 1st address in TLV |
| ... | |
| Address | Nth address in TLV |

FIG. 53

Cust-res ACK

| Fields | Values |
| --- | --- |
| Parameter Type Identifier | 12 for Cust-res ACK |
| Length | Length of remainder of TLV parameter in bytes |
| Sequence Number | Sequence number of request being acknowledged |

FIG. 54

Solicitation ACK

| Fields | Values |
| --- | --- |
| Parameter Type Identifier | 13 for Solicitation ACK |
| Length | Length of remainder of TLV parameter in bytes |
| Sequence Number | Sequence number of request being acknowledged |

FIG. 55 gen-res rq

| Fields | Values |
| --- | --- |
| RRI | Request/Response Indicator; 0 for request |
| Opcode | 1 for gen-res |
| Sequence Number | Sequence Number |
| Flags | reserved |
| Length | Total length of included TLVs |
| TLVs | Included TLVs |

System ID (m)
Group ID (m)
Receiver Protocol Addresses (m)
Receiver Hardware Addresses (m)
Hardware Type (o)              defaults to Ethernet
Protocol Type (o)              defaults to IPv4
Requested Group Algorithm (o)  defaults to a protocol default algorithm
Cache Time (o)                 requests sender to use specified cache duration

FIG. 56 cust-res rq

| Fields | Values |
|---|---|
| RRI | Request/Response Indicator: 0 for request |
| Opcode | 2 for cust-res |
| Sequence Number | Sequence Number |
| Flags | reserved |
| Length | Total length of included TLVs |
| TLVs | Included TLVs |

System ID (m)
Group ID (m)
Receiver Protocol Addresses (m)
Receiver Hardware Addresses (m)
Hardware Type (o)                  defaults to Ethernet
Protocol Type (o)                  defaults to IPv4
Requested Group Algorithm (o)      defaults to a protocol default algorithm
Cache Time (o)                     requests sender to use specified cache duration
cust-res ACK (o)
Solicitation ACK (o)               if sent in response to a solicitation rq

FIG. 57 cust-res rsp

| Fields | Values |
|---|---|
| RRI | Request/Response Indicator: 1 for response |
| Opcode | 2 for cust-res |
| Sequence Number | Sequence Number (same number as request) |
| Flags | reserved |
| Length | Total length of included TLVs |
| TLVs | Included TLVs |

System ID (m)
Group ID (m)
Receiver Protocol Addresses (m)
Receiver Hardware Addresses
(m)                                as cached by sender system
Hardware Type (o)                  defaults to Ethernet
Protocol Type (o)                  defaults to IPv4
Requested Group Algorithm (o)      defaults to a protocol default algorithm
Set Group Algorithm (o)            defaults to the same as Requested Group Algorithm

FIG. 58 solicitation rq

| Fields | Values |
|---|---|
| RRI | Request/Response Indicator; 0 for request |
| Opcode | 3 for solicitation |
| Sequence Number | Sequence Number |
| Flags | reserved |
| Length | Total length of included TLVs |
| TLVs | Included TLVs |

System ID (m)
Group ID (m)
Receiver Protocol Addresses (m)
Receiver Hardware Addresses (o)     what is currently cached or was cached before gen-res
Hardware Type (o)     defaults to Ethernet
Protocol Type (o)     defaults to IPv4
Set Group Algorithm (o)     defaults to a protocol default algorithm

FIG. 59 query rq

| Fields | Values |
|---|---|
| RRI | Request/Response Indicator; 0 for request |
| Opcode | 4 for query |
| Sequence Number | Sequence Number |
| Flags | reserved |
| Length | Total length of included TLVs |
| TLVs | Included TLVs |

System ID (m)
Group ID (m)
Receiver Protocol Addresses (m)
Hardware Type (o)     defaults to Ethernet
Protocol Type (o)     defaults to IPv4

FIG. 60 query rsp

| Fields | Values |
|---|---|
| RRI | Request/Response Indicator; 1 for response |
| Opcode | 4 for query |
| Sequence Number | Sequence Number (same number as request) |
| Flags | reserved |
| Length | Total length of included TLVs |
| TLVs | Included TLVs |

System ID (m)
Group ID (m)
Receiver Protocol Addresses (m)
Receiver Hardware Addresses
(m)                              as cached by sender system
Set Group Algorithm (m)          defaults to the same as Requested Group Algorithm
Hardware Type (o)                defaults to Ethernet
Protocol Type (o)                defaults to IPv4

FIG. 61

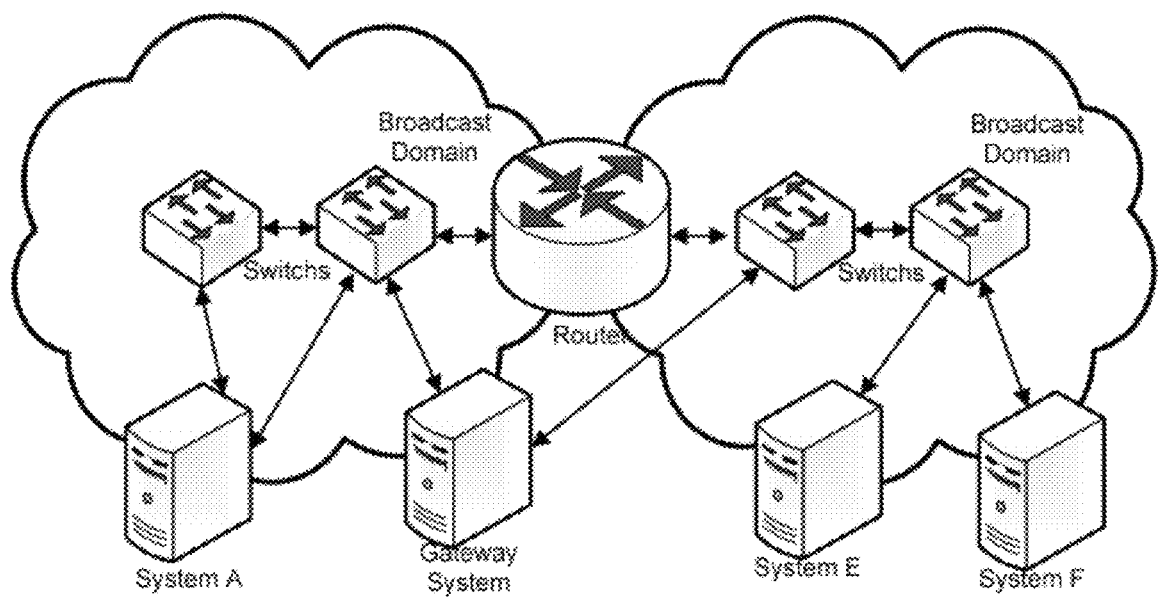

FIG. 62

METHOD AND APPARATUS FOR NETWORK ADDRESS RESOLUTION

CROSS-REFERENCE TO RELATED APPLICATIONS

The present application claims priority from U.S. Provisional Application Ser. No. 61/172,778, titled "METHOD AND APPARATUS FOR NETWORK ADDRESS RESOLUTION" filed Apr. 26, 2009 which is incorporated by reference herein in its entirety.

FIELD OF THE INVENTION

The present invention relates in general to network communications and, more specifically, methods and mechanisms for resolving layer three network addresses to layer 2 hardware addresses.

TERMINOLOGY address resolution message—a message used in resolving protocol addresses to hardware addresses
ARP—Address Resolution Protocol
ARP announcement—an ARP reply sent without an ARP request having been received or a unicast ARP request sent with the target protocol address as well as the target hardware address set to zeros
ARP probe—an ARP request in which the sender protocol address is all zeros rather than containing the protocol address of the sender
ARP request—defined by RFC 826
ARP response—defined by RFC 826
broadcast ARP request—an ARP request sent to all systems on the broadcast domain
broadcast domain—a logical division of a computer network, in which all nodes can reach each other by broadcast at the data link layer
broadcasting—sending a message or frame to all systems on a broadcast domain and requesting that all the systems examine the frame
cache—a table which stores associations between pieces of information
cache entries—a particular instance of an association between pieces of information in a cache
communications end-point—The end-point of a communications path. A layer 2 communications end-point would be an associated system on the broadcast domain for the originating system whereas a layer 3 communications end-point would be the layer 3 destination system and would not necessarily be on the same broadcast domain
communications interface—The interface by which a system connects to the network
cust-res rq—custom resolution request
cust-res rsp—custom resolution response
entry lifetime—the length of time since a cache entry was last refreshed that an expired cache entry will remain in the cache table
ethernet—A networking technology for local area networks
expired cache entry—an entry in a cache table that is no longer considered valid most likely due to have exceeded the expire time for the entry without having been refreshed
frame—a data link layer data packet.
gen-res rq—general resolution request
group algorithm identifier—identifies the algorithm to be used for distributing packets between links
Group Table—a table that maintains information for the multiple interfaces that are in the receive groups
HA—see hardware address
hardware address—The layer 2 address of a system typical a MAC address
hold down list—a list of general resolution requests that have been sent and so should not be sent again as long as they are on the hold down list
information group—a group of information that has an association such as a protocol address and a hardware address
Last Access Time—the last time the entry was accessed for forwarding a data packet
link aggregation—bundling interfaces on one system with interfaces on another system in a manner that allows the interfaces to look like one logical interface
Load Balancing—a technique to distribute workload across two or more network interfaces
MAC address—A layer 2 address for a device.
maximum delay interval—the maximum delay a system should use between when it receives a broadcast gen-res request and when it sends a solicitation request
maximum idle time—the maximum amount of time that can elapse since a cache entry has been used for forwarding a frame and still have an attempt made to refresh the cache entry
minimum delay interval—the minimum delay a system should use between when it receives a broadcast gen-res request and when it sends a solicitation request
NAT—see network address translation
neighboring computing apparatus—a computer apparatus that is a part of the same broadcast domain as the originating apparatus
network address translation—the process of modifying network address information in datagram (IP) packet headers while in transit across a traffic routing device for the purpose of remapping a given address space into another
network segment—A portion of a network that belongs to the same collision domain for a local area network.
next hop system—the next layer 2 system to which a packet will be transmitted
originating system—the system originating a request
PA—see protocol address
port—The interface circuitry on a port for connecting a network segment.
protocol address—An address for identifying a system at the network layer
query rq—query request
RAG—see Receive Aggregation Group
RAGR—Functionality to both receive using RAG and send to a system that is RAG capable using RAG
RAGS—Functionality to send to a system that is RAG capable using RAG
Receive Aggregation Group—functionality to facilitate receive load balancing over multiple interfaces on a system
refresh hold time—The length of time that must elapse between refresh attempts
Refresh Time—the point in time where the cache entry is eligible to be refreshed
resolution method—a method of determining one or more pieces of associated information given another piece of associated information such as determining a hardware addresses from a given protocol address
solicitation rq—solicitation request
switching device—A device for connecting network segments.
targeted system—the system needing to take action on a request TLV—A parameter that has a type field, a length field and a value field traffic—the flow of frames.

trunk—A network segment that transports frames for multiple VLANs unicast address—An address specifying a unique device.

unicast ARP request—an ARP request sent directly to a neighboring system unicasting—sending a message or frame directly to another system. Even if other systems on a broadcast domain receive a frame they are not to examine it.

valid cache entries—a cache entry that is valid to use for resolution of associated information virtual local area network—A logical grouping of devices in a network forming a separate broadcast domain VLAN—A Virtual Local Area Network.

BACKGROUND OF THE INVENTION

The present invention is an improvement of the prior art for methods and apparatuses for resolving and caching address resolution information between layer 3 protocol addresses and layer 2 hardware addresses. In particular, the present invention addresses difficulties presented when computer systems have more than one communications interface connected to the same layer 2 network The Internet Engineering Task Force (IETF) Request For Comment (RFC) 826 is the standard for how the Address Resolution Protocol (ARP) should work in many environment including layer 2 Ethernet networks and layer 3 IPv4. RFC 826 is incorporated herein in its entirety by this reference. RFC 826 also highlights issues that drive systems to cache address resolution information and issues that drive the need to put a time limit on how long such information can be cached before it is aged out. Most systems will cache an entry for a set length of time after it is learned and then remove it from the cache. After it is removed, a broadcast ARP request is sent to resolve the address again and then re-cache the results. Some Linux systems will retain a cache entry after it has aged out and the next time a packet is to be sent to that protocol address it will send a directed ARP request to the specific hardware address in the cache entry to verify the mapping is still correct. If the target system responds with an ARP response, the requesting system will refresh the cache entry. If not, the requesting system will send a broadcast ARP request to resolve the mapping.

Address resolution becomes far more challenging when systems have multiple communications interfaces connecting to the same broadcast domain of a network or the same subnet at layer 3. The ARP protocol describe in RFC826 and almost universally implemented in systems that utilize the Internet Protocol version 4 (IPv4) with Ethernet networks only supports mapping a specific protocol address (IP address with IPv4) to a single hardware address (Media Access Control or MAC address with Ethernet). There is substantial prior art attempting to deal with the additional challenges of address resolution when systems have multiple communications interfaces. A driving force is to allow for load balancing of traffic over the multiple interfaces. Another driving force is to allow the interfaces to be connected to multiple switches to allow for redundancy if an entire switch should fail.

Some prior art solutions allow for multiple interfaces to be connected to different switches but only one interface is utilized by the system as any particular point in time. If the primary interface fails or the switch the primary interface is connected to fails, the secondary interface is utilized. This is sometimes referred to as a Fault Tolerant configuration. A Fault Tolerant configuration does not provide for load balancing of traffic over the connections. Some prior art solutions succeed in allowing for load balancing when sending traffic over multiple interfaces but only allows one interface at a time to be used for receiving traffic from other systems. This is sometimes referred to as Transmit Load Balancing. Other prior art solutions allow for a group of interfaces on one system to be bundled together with multiple interfaces on a switch in a manner that allows multiple interfaces to look like one logical interface to both the system and the switch and allows traffic to be load balanced both when sending and receiving, but all of the interfaces in the bundle have to go to the same switch. This is sometimes referred to as Link Aggregation. The IEEE 802.1AX-2008 standard incorporated herein in its entirety by this reference describes the Link Aggregation Control Protocol (LACP) as a standardized way to perform link aggregation. Some solutions allow for the creation of multiple bundles to different switches, but only one bundle can be active at the same time which can be seen as a combination of a Fault Tolerant configuration and Link Aggregation. Another group of solutions allows for multiple switches to appear as though they are a single switch and so the bundle of interfaces can connect to different switches as is exemplified by the variants of Multi-Link Trunking (MLT) designed by Nortel. The following list of patents and patent applications provide a good understanding of the current state of the art and each of them are incorporated herein in their entirety by this reference:

Patent application Ser. No. 11/208,690 titled "NETWORK RESOURCE TEAMING PROVIDING RESOURCE REDUNDANCY AND TRANSMIT/RECEIVE LOAD-BALANCING THROUGH A PLURALITY OF REDUNDANT PORT TRUNKS";

U.S. Pat. No. 7,505,399 titled "Receive load balancing on multiple network adapters";

U.S. Pat. No. 7,145,866 titled "VIRTUAL NETWORK DEVICES";

Patent application Ser. No. 11/048,520 titled "Automated selection of an optimal path between a core switch and teamed network resources of a computer system";

U.S. Pat. No. 6,687,758 titled "PORT AGGREGATION FOR NETWORK CONNECTIONS THAT ARE OFF-LOADED TO NETWORK INTERFACE DEVICES";

Patent application Ser. No. 11/048,524 titled "Dynamic allocation and configuration of a computer system's network resources";

U.S. Pat. No. 6,151,297 titled "METHOD AND SYSTEM FOR LINK LEVEL SERVER/SWITCH TRUNKING";

U.S. Pat. No. 7,505,401 titled "Method, apparatus and program storage device for providing mutual failover and load-balancing between interfaces in a network";

Patent application Ser. No. 11/468,577 titled "METHOD AND SYSTEM OF TRANSMIT LOAD BALANCING ACROSS MULTIPLE PHYSICAL PORTS";

Patent application Ser. No. 10/439,494 titled "SYSTEM, METHOD, AND APPARATUS FOR LOAD-BALANCING TO A PLURALITY OF PORTS";

Patent application Ser. No. 10/938,156 titled "System and method for load balancing and fail over";

U.S. Pat. No. 6,056,824 titled "EXTENSION OF LINK AGGREGATION PROTOCOLS OVER THE NETWORK"; and U.S. Pat. No. 7,173,934 titled "System, device, and method for improving communication network reliability using trunk splitting".

Patent application Ser. No. 11/208,690 is particularly interesting in that it puts forth a means for receive load balancing by having a system with multiple interfaces replace the hardware address in different ARP responses with the different hardware addresses of its interfaces. However, the patent application also correctly points out that as soon as the system sends out an ARP request, this will cause all of the systems on the network to start sending to one single interface.

Turning now to Prior Art FIG. 1, when system A needs to send a packet or frame and system B is the destination or the next hop at the network layer, System A will have determined the protocol address (PA) of System B but will not necessarily know the hardware address (HA) of System B unless it has the mapping from the protocol address for System B to the hardware address for System B in its ARP cache. If it does not have the mapping in its ARP cache, it will build an ARP request and broadcast the request to all of the systems in the broadcast domain. The fields in the ARP request are depicted in prior art FIG. 2. The definitions and intended uses of the fields can be found in RFC 826.

System A broadcasts the ARP request to all of the systems in the broadcast domain because without knowing the hardware address for System B, it does not know how to send the ARP request directly to System B. Therefore, the only way System A has available to it to communicate the ARP request to System B is to indicates that all systems in the broadcast domain should look at the ARP request. System A includes its own protocol address and hardware address in the Sender Protocol Address and Sender Hardware Address in the ARP request as depicted in FIG. 2 to allow System B to cache that mapping as a result of the ARP request. Otherwise, since System B is likely to need to send frames back to System A in the near future, System B would need to send out an ARP request to resolve the mapping between System A's protocol address to hardware address in the near future. Since all of the systems in the broadcast domain look at the ARP request that System A sends all of the systems can cache the mapping between System A's protocol address and hardware address.

The ARP request also includes the target protocol address that system A wants resolved. All of the systems look at the ARP request, but only System B recognizes the target protocol address as one it owns. Therefore, only system B sends an ARP reply back to system A with the mapping between system B's protocol address and hardware address. Because system B knows the hardware address for System A it sends the ARP response directly to System A rather than sending it to all of the systems on the broadcast domain. Only system A sees the mapping between System B's protocol address and hardware address. The fields in the ARP reply are depicted in prior art FIG. 3. The definitions and intended uses of the fields can be found in RFC 826.

As a result of this ARP exchange, System A will have cached the mapping between System B's protocol address and hardware address and System B will have cached the mapping between System A's protocol address and hardware address. As well, any of the other systems in the broadcast domain may have cached the mapping between System A's protocol address and hardware address. At this point, data traffic can be sent in both directions between System A and System B as is depicted in FIG. 1.

An exemplary ARP cache table is depicted in prior art FIG. 4. This depiction shows a protocol field in the cache. Each mapping is unique for a particular protocol. If a broadcast domain transports more than one protocol, more than one type of protocol address could be mapping to the same hardware address. Another implementation could have separate ARP cache tables for each protocol. Also, if only one protocol is supported, the Protocol field would not be needed. FIG. 4 also depicts a VLAN field. When Virtual Local Area Networks (VLANs) are supported, each VLAN is logically its own broadcast domain. Therefore, there is a separate mapping between protocol address and hardware address for each VLAN and the VLAN field identifies which VLAN this cache entry is mapping. If the system does not support VLANs then the VLAN field is not needed. The IEEE 802.1Q specification incorporated herein in its entirety by this reference defines a standard for implementing VLANs. The table in FIG. 4 provides a mapping from a protocol address in the Protocol Address field to a hardware address in the Hardware Address field. One protocol address maps to only one hardware address. If a new ARP is received mapping the protocol address (on this VLAN) to a different hardware address, the new mapping will replace the current mapping. The FIG. 4 cache table also includes an Expire Time. This indicates when the cache entry should no longer be considered valid and be removed. After the entry is removed, if the system needs to send a packet to the protocol address the entry was for, it will need to generate another ARP request and broadcast it to the broadcast domain.

Some Linux systems have adapted the ARP protocol a bit such that when the cache entry has expired, rather than removing the entry from the cache, they indicate it has expired and the next time a packet is being sent to that protocol address, the system sends a directed ARP request directly to the hardware address that was in the cache entry to verify if the mapping is still valid. If it is, the target system will send back an ARP replay. This saves broadcasting an ARP request to every system in the broadcast domain. However, if the mapping is not still valid, the system will still need to broadcast an ARP request and there will be a greater delay before the mapping is resolved during which the data traffic is being queued or dropped.

An object of the present invention is to provide an improved method for caching address mappings between protocol addresses that minimized the time that data traffic is queued or dropped while still allowing for cache entries to be aged out when they are not being used.

An additional object of the present invention is to provide an improved method and mechanism for receive load-balancing of data traffic over multiple communications interfaces connected to the same broadcast domain wherein the communications interfaces do not need to be connected to the same switch.

BRIEF SUMMARY OF THE INVENTION

The present invention improves ARP cache management by refreshing the cache entry before the entry had expired rather than waiting until the entry has expired and a data packet is waiting to be sent before attempting to refresh the entry. To do this, a refresh window is determined before the cache entry expires. When an entry is within this refresh window, the system will send a directed ARP request to the target system to verify the mapping is still valid. If the target system responds with an ARP reply, the expire time will be updated in the cache entry. Since the ARP requests are directed only to the target system, this also has the effect of reducing broadcast traffic.

However, it is still important for there to be a reasonable mechanism for cache entries to age out. To accomplish this, a last access time is maintained to indicate the last time the cache entry was accessed to forward a data packet. If more than a maximum idle time has elapsed since the cache entry was last accessed for sending a data packet then no attempt will be made to refresh the cache entry even if the entry is within the refresh window. The last access time also allows a better decision to be made as to which cache entries to drop if the cache fills up. Instead of dropping the cache entries that are the closest to expiring (which could still be heavily utilized cache entries), the cache entries least recently used can be dropped.

The present invention also modifies how the ARP protocol is utilized to overcome the receive load balancing shortcomings identified in U.S. patent application Ser. No. 11/208,690. A system implementing the present invention to allow receive load balancing on multiple interfaces connected to the same broadcast domain will not broadcast an ARP request that includes the mapping information between its own protocol address and hardware address. Instead, the ARP request that is broadcast does not include the protocol address of the sending system. Such an ARP request without a source protocol address included, referred to as an ARP probe, is described in IEFT RFC 5227 which is incorporated herein in its entirety by this reference. However, RFC 5227 uses the ARP probe for a very different reason. RFC 5227 is using the probe to verify that no other system is using the target protocol address whereas this invention is using an ARP probe to resolve the mapping for another system while masking its own mapping from other systems that will listen to the broadcast message. This precludes the non-targeted systems from resolving the mapping and leaves the system in complete control as to what mapping it is going to provide each individual system. Since this also does not allow the targeted system to resolve the mapping between the senders protocol address and hardware address and it is likely the target system will need to be sending traffic to the originating system, the originating system can proactively send the target system a directed ARP announcement providing the targeted system with the mapping to the hardware address it wants. This allows it to provide different hardware addresses to different systems. This improvement works with other systems that have not implemented the current invention.

However, often, the vast majority of the data traffic a system receives is from a single partner system (the gateway). So, the current invention also discloses a method and a mechanism for setting up Receive Aggregation Groups (RAGs) allowing a system to load balance traffic received from a single partner system over multiple communications interfaces connected to the same broadcast domain. This invention allows the partner system to resolve the receiving systems protocol address to multiple hardware addresses and to send data traffic to those multiple addresses. This allows receive load balancing and allows the interfaces to be connected to different switches. Exemplary embodiments are provided both for implementations that can just send to receive aggregation groups and implementations that can both send to link aggregation groups and receive on link aggregation groups.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a prior art flow diagram of ARP traffic;
FIG. 2 is a prior art illustration of an ARP request;
FIG. 3 is a prior art illustration of an ARP response;
FIG. 4 is a prior art illustration of an ARP cache table;
FIG. 5 is an illustration of a system that can implement the current invention;
FIG. 6 is an illustration of the lower three layers of the communications stack;
FIG. 7 is an illustration of an enhance cache table of the current invention;
FIG. 8 is an illustration of an exemplary network environment;
FIG. 9 is an illustration of the process of the current invention when receiving address resolution information;
FIG. 10A is an illustration of the process of removing cache entries with they age out;
FIG. 10B is an illustration of an alternate process of marking cache entries as expired with they age out;
FIG. 11A is an illustration of an exemplary process of removing cache entries when the cache is close to full;
FIG. 11B is an illustration of an alternate exemplary process of removing cache entries when the cache is close to full;
FIG. 12 is an illustration of the process of the current invention for refreshing cache entries;
FIG. 13 is a flow diagram of modified ARP traffic;
FIG. 14 is an illustration of an ARP probe;
FIG. 15 is an illustration of a modified ARP reply;
FIG. 16A is an illustration of an ARP announcement;
FIG. 16B is an illustration of an alternate ARP announcement;
FIG. 17 is a flow diagram of a system responding to an ARP request;
FIG. 18 is an illustration of an extended ARP reply or ARP announcement modified to allow for communicating multiple hardware addresses;
FIG. 19A is an illustration of the additional fields added to the enhanced ARP cache table to support receive aggregation groups (RAG);
FIG. 19B is an illustration of the group table for RAG;
FIG. 19C is a flow diagram of the address resolution flows between two RAGR systems;
FIG. 19D is a flow diagram of an alternate set of flows for address resolution between two RAGR systems;
FIG. 20 is a flow diagram of the address resolution flows between a RAGR and a RAGS system;
FIG. 21 is a flow diagram of the address resolution flows between a RAGR and a non RAG system;
FIG. 22 is a flow diagram of the address resolution flows between a RAGS and a RAGR system;
FIG. 23 is a flow diagram of the address resolution flows between a RAGS and a non RAG system;
FIG. 24 is a flow diagram of the address resolution flows between a non RAG and a RAGR system;
FIG. 25 is a flow diagram of a multicast update;
FIG. 26 is a flow diagram of a query;
FIG. 27 is an illustration of the process of the current invention when receiving traffic on an interface that is part of a RAGR group;
FIG. 28 is an illustration of the process of the current invention for processing ARP traffic received on a RAGR group;
FIG. 29 is an illustration of the process of the current invention for processing RAG traffic received on a RAGR group;
FIG. 30 is an illustration of the process of the current invention for processing a gen-res request received on a RAGR group;
FIG. 31 is an illustration of the process of the current invention for processing a cust-res request received on a RAGR group;
FIG. 32 is an illustration of the process of the current invention for sending a cust-res request;
FIG. 33 is an illustration of the process of the current invention for sending a cust-res request with an ACK for a received cust-res request;

FIG. 42 is an illustration of the process of the current invention when an interface in a RAGR group changes status;

FIG. 43 is an illustration of the process of the current invention for ignoring repeated gen-res requests after the first one is received;

FIG. 44 is an illustration of the process of the current invention for sending a query request;

FIG. 45 is an illustration of the TLV for System ID;

FIG. 46 is an illustration of the TLV for Hardware Type;

FIG. 47 is an illustration of the TLV for Protocol Type;

FIG. 48 is an illustration of the TLV for Group ID;

FIG. 49 is an illustration of the TLV for Requested Group Algorithm;

FIG. 50 is an illustration of the TLV for Set Group Algorithm;

FIG. 51 is an illustration of the TLV for Cache Time;

FIG. 52 is an illustration of the TLV for Receiver Protocol Addresses;

FIG. 53 is an illustration of the TLV for Receiver Hardware Addresses;

FIG. 54 is an illustration of the TLV for cust-res ACK;

FIG. 55 is an illustration of the TLV for solicitation ACK;

FIG. 56 is an illustration of a gen-res request;

FIG. 57 is an illustration of a cust-res request;

FIG. 58 is an illustration of a cust-res response;

FIG. 59 is an illustration of a solicitation request;

FIG. 60 is an illustration of a query request;

FIG. 61 is an illustration of a query response;

FIG. 62 is an illustration of the network environment with a gateway using NAT to force off-domain traffic through it;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIG. 1 through FIG. 4 are described in the BACKGROUND OF THE INVENTION section.

FIG. 5 is a depiction of the minimum requirements of a computer system (or computing apparatus) that can implement a preferred embodiment of the current invention. The system would need a central processing unit (CPU), some form of memory, one or more communications interfaces or network interface cards (NICs) and some form of bus to allow the components to communicate with one another. The CPU encompasses the processing circuits necessary for executing the instructions necessary for realizing a preferred embodiment of the current invention. The instructions would be retained in some form of memory system or storage. As well, the ARP cache and Group Table would be retained in a memory system. The NICs enable the connections to the broadcast domain. A system with only on NIC could beneficially implement sending to a RAG while a system would need a plurality of NICs before there would be any benefit from RAGs. A number of the included references describe systems capable of embodying the current invention.

FIG. 6 depicts the lower three layers of the communications stack and where connection end-points terminate in the stack and what type of addresses are utilized at that level. It should be noted that while FIG. 6 depicts all three layers residing on the NIC that all three layers do not need to be implemented on the NIC. Layer 1 identifies the physical media the NIC connects to and is not really applicable to the current invention. Layer 2 is the Data Link Control (DLC) layer and is capable of communicating within a broadcast domain. This layer utilizes hardware addresses. The most common hardware address in use today is the Media Access Control (MAC) address. This layer is the communication end-point for the broadcast domain. Layer 3 is the Network layer and is capable of communicating hop-by-hop across the network. This layer utilizes protocol addresses. The most common protocol address in use today is the IPv4 IP address. The network layer determines the next hop protocol address a packet needs to be sent to. It is the need to map this protocol address to a layer 2 hardware address before layer 2 can send the packet to the next hop system that drives the address resolution requirements. This layer is the communication end-point for the network layer.

FIGS. 7-12 depict enhancements to cache refresh management.

Figures 7, 8:
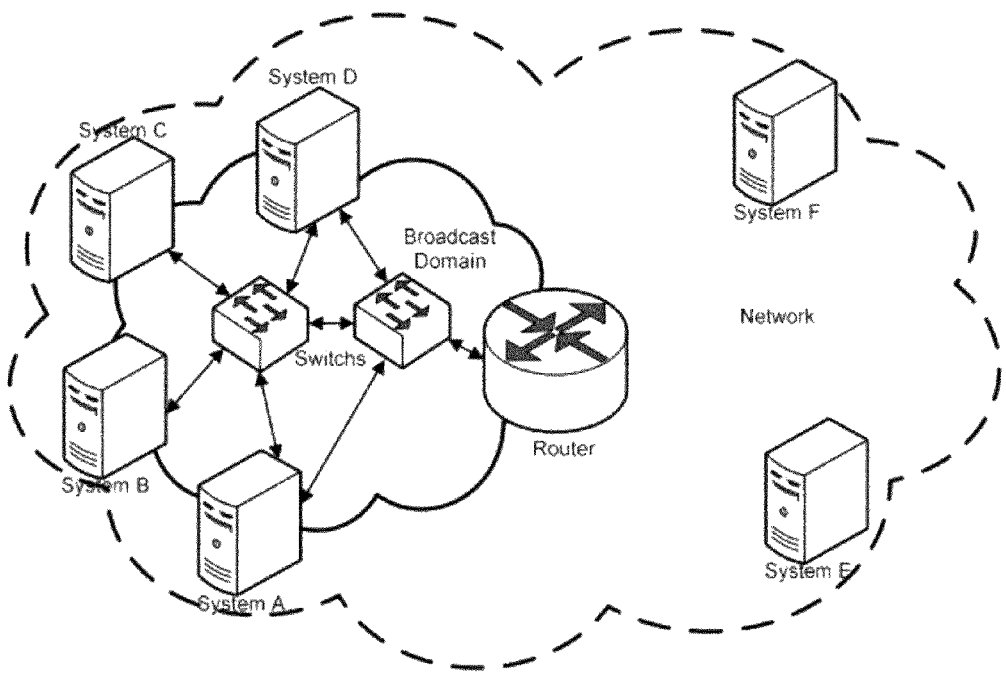

FIG. 7 depicts an exemplary embodiment of an enhanced ARP cache table of the current invention. The protocol, VLAN and Expire time fields are the same as in prior art FIG. 4. The PA field is the same as the Protocol Address field of prior art FIG. 4 and the HA field is the same as the Hardware Address field for prior art FIG. 4. The enhancements include fields for Max Idle Time, Refresh Time, Last Access Time, and Status. The Refresh time is the point in time where the cache entry is eligible to be refreshed. The refresh time should be earlier than the expire time. The last access time indicates the last time the entry was accessed for forwarding a data packet. The Max Idle time indicates how long after the last access time a cache entry is still eligible for the refresh process. The status is a Boolean value that indicates if the cache entry is still valid or if it has expired. This would only need to be used with embodiments that do not immediately remove cache entries when they reach their expire time. This could also be implemented simply by comparing the current time to their expire time rather than including a Boolean variable in the cache entry.

FIG. 8 depicts a network environment for an embodiment of the current invention. The switches are the infrastructure for a Broadcast Domain. If the switches support multiple VLANs each VLAN is its own broadcast domain. In this example systems A, B, C, and D, and the router are all connected to the same VLAN on the switches and are therefore part of the same broadcast domain. This broadcast domain is part of the over all network. A broadcast domain is also usually (but not always) equivalent to a subnet of the overall network. The router may also be connected to other broadcast domains or subnets of the network. One of the functions of the router is to forward layer three packets it receives between the depicted broadcast domain and other subnets in the network. This function can allow systems A-D to communicate with systems E and F. From the prospective of systems A-D, systems E and F are off the broadcast domain or off-domain. Systems A and D each have two NICs going to different switches.

FIG. 9 depicts the processing that occurs when address resolution information is received by an embodiment of the current implementation. This could, for instance result from receiving an ARP reply as is depicted in FIG. 1 or by seeing a broadcasted ARP request sent by another system. When the information is received, the process will determine when the information will expire (should no longer be used for forwarding data traffic), when the refresh window will start, and the Max Idle time for the information. The process will determine if the protocol address is already in the cache. If it is, it will refresh, or update the information in the cache entry (including the hardware address if it has changed), the expire time, the refresh time, and if it has changed, the Max Idle time. If the status of the entry has been set to expired, it will be changed back to valid. The last accessed time will not be updated as a result of receiving address resolution information. If the protocol address is not already in the cache then a new cache entry will be created with all the values set the same as the refresh values. However, in this case, the last accessed time will be set to the current time.

Figure 10A:
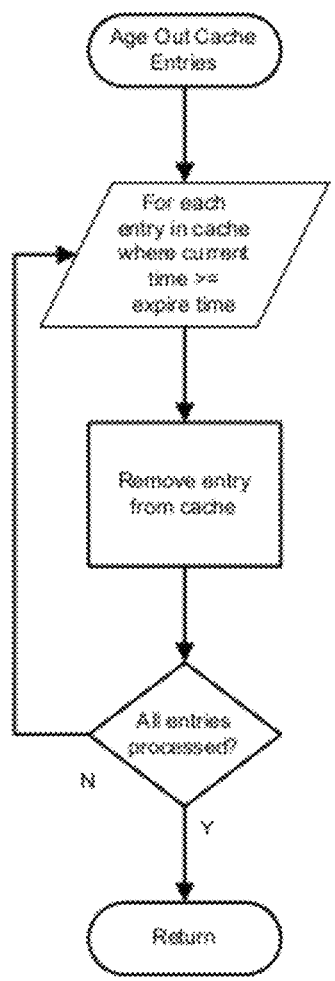

FIG. 10A is an exemplary embodiment of aging out old cache entries. This process essentially looks at each cache entry and if the current time is later that the expire time in the cache entry then the entry is removed.

Figure 10B:
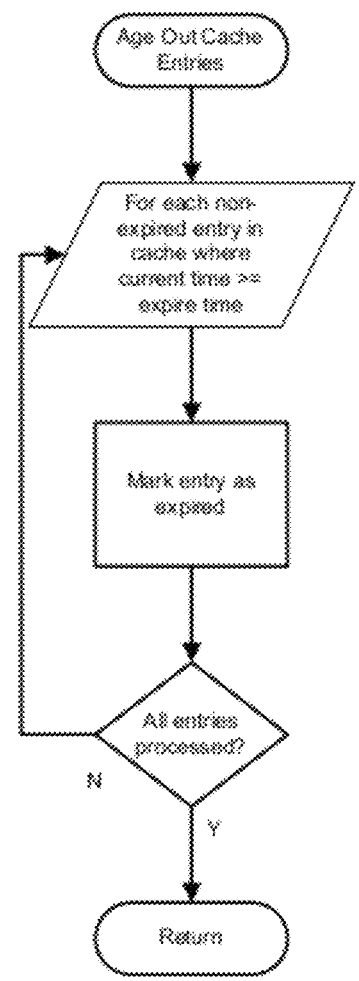

FIG. 10B is a similar exemplary embodiment of aging out old cache entries except this process looks at non expired entries and if the current time is later than the expire time in the cache entry then the entry is marked as expired rather than removed. The expired cache entry can later be removed either by a process that checks expired cache entries and removes one that are greater that a certain length of time beyond the expire time, or by a process like that depicted in FIG. 11B.

FIG. 11A is an exemplary embodiment of a process that removes cache entries when the cache is utilizing a particular percentage or more of its allocated memory. FIG. 11A shows 90% as the point when this process will start removing entries, but this is just exemplary. The figure also indicates that the process will continue to remove entries until the memory utilization is down to or less than 80%. This also is exemplary. When the cache memory utilization is >=the specified high water mark (90% in this example), the process sorts the cache entries by the least recently accessed to the most recently accesses (based upon the last accessed time field in each cache entry). The process then continues to remove the least recently accessed cache entries until the cache memory utilization has dropped down to or below the specified low water mark (80% in this example).

FIG. 11B is similar to 11A except this process is intended to be used with exemplary embodiments that utilize a process similar to FIG. 10B that marks cache entries as expired, but does not immediately remove them. In this case the cache entries are first sorted by status, expired first and then valid, and then each group of cache entries are further sorted from least recently accessed to most recently accessed (as determined by the last accessed time field for each cache entry). Then the least recently accessed expired entries are removed first. If all of the expired entries have been removed and the cache memory utilization is still above the low water mark then the process will start removing the least recently accessed valid cache entries until the cache memory utilization is down to or below the low water mark.

FIG. 12 is an exemplary embodiment of a process that attempts to refresh cache entries before they expire. For each of the valid cache entries that have entered into the refresh window the process check if the cache entry has gone longer than the max idle time since it was last accessed. If it has, then the process does not attempt to refresh this entry at this time. As a result, if the cache entry continues to not be accessed and no new address resolution information is received for the protocol address then the cache entry will age out when it reaches the expire time. If the cache entry has been accessed within the last max idle time length of time then the process sends a directed ARP request to the system identified by the cache entry. If the mapping in the cache entry is still valid then the target system should reply with an ARP response causing the information in the cache entry to be refreshed by the process depicted in FIG. 9. If the mapping is not still valid then an ARP response will not be received, the cache entry will not be refreshed, and the cache entry will age out. Of course, if a new mapping is learned for the protocol address via the process of FIG. 9 that will replace the existing information in the cache entry and reset the expire time and refresh time. Also not depicted is a mechanism to assure there is at least a certain length of time between refresh attempts. It is possible to determine a refresh hold time such that refresh attempts would not be made more frequently that the refresh hold time.

FIGS. 13-18 depict enhancements to the Address Resolution Protocol that enables a system to improve receive load balancing by having different partner systems sending to different interfaces. This enhancement only needs to be implemented on the system that wants to perform receive load balancing. The key here is to control what hardware address each system places in its cache for the receiving systems protocol address. Also, this discussion is only dealing with receive load balancing. However, the system can also perform send load balancing for example by using one of the methods described in the referenced patents and patent applications.

In FIG. 13, system A is receive load balancing. In order to control what mappings other systems on the broadcast domain cache for system A's protocol address, when system A needs to resolve a protocol address for a partner system on the broadcast domain, system A broadcasts an ARP probe rather than ARP request. The only difference between an ARP request as depicted in prior art FIG. 2 and an ARP probe as is depicted in FIG. 14 is that in the ARP probe the sender protocol address is all zeros rather than containing the protocol address of the sender as is the case with the ARP request. Because the sender protocol address is not included in the ARP probe, other systems on the broadcast domain will not be able to resolve the senders protocol address to a hardware address. The target system of the ARP probe (system B) will send an ARP reply directly back to system A. The ARP reply is depicted in FIG. 15. The only difference between the ARP reply of FIG. 15 and the ARP reply of FIG. 3 it that the Target Protocol Address in FIG. 15 will contain all zeros whereas the Target Protocol Address of the ARP reply in FIG. 3 would contain the protocol Address for system A. This is because system B moves the sender protocol address and hardware address from the ARP probe to the Target protocol address and hardware address in the ARP response. Since the sender protocol address in the ARP probe contained all zeros, the Target protocol address in the ARP response contains all zeros.

Unfortunately, since system A's protocol address was not in the ARP probe, system B also can not yet resolve system A's protocol address to a hardware address and system B is likely to need to send traffic to system A soon. So as a courtesy, system A can send an ARP announcement directly to system B to allow system be to resolve system A's protocol address. Because System A sends the ARP announcement directly to system B and does not broadcast it, no other systems will be able to resolve system A's protocol address as a result of the ARP announcement. There are two exemplary embodiments for the ARP Announcement depicted in FIG. 16A and FIG. 16B. ARP Announcement A in FIG. 16A is identical to an ARP reply as depicted in FIG. 3 except that it is being sent without an ARP request having been received. ARP Announcement B in FIG. 16B is the same as an ARP request as depicted in FIG. 2 except that the target protocol address as well as the target hardware address will both be zeros and it is unicast to the targeted system rather than broadcast. Both forms of the ARP announcement should cause System B to update its ARP cache with a resolution for system A's protocol address and should not cause any other systems to update their cache. System A puts the hardware address system A wants system B to send to into the source hardware address in the ARP announcement giving system A complete control over what hardware address each system resolves for system A's protocol address.

If system A does not send the ARP Announcement or if system B is initiating a connection to system A then, as is depicted in FIG. 17, system B will issue a broadcast ARP request looking to resolve System A's protocol address. When system A sees the ARP request it will send a directed ARP response with the mapping it wants system B to cache. Again, since system A sends the ARP response directly to system B no other systems will cache the mapping system A sends to system B. If both system A and system B have implemented this enhancement then the flows will be those depicted in FIG. 13.

FIG. 18 shows that the ARP formats can be modified to allow for communication of one protocol address mapping to multiple hardware addresses, this would not be a preferred embodiment. The preferred exemplary embodiment to allow one sender to load balance to multiple interfaces on the receiver would be to use the Receive Aggregation Group (RAG) discussed next.

FIGS. 19A through 62 depict Receive Aggregation Groups (RAG).

In the following discussion, RAGR indicates a group of interfaces that supports sending to a RAG group on another system and receive load balanced traffic. RAGS indicates an interface or group of interfaces that support sending receive load balanced traffic to a RAGR group of interfaces on another system.

In order to support sending receive load balanced traffic to a RAG group on another system, the sending RAGS system needs an enhanced ARP cache and needs to maintain a Group table. The exemplary embodiment depicted in FIG. 19A identifies the additional fields in the ARP cache in addition to those depicted in FIG. 7. If the group Boolean is true then the cache entry is for a RAGR partner. The system ID identifies the RAGR partner and the Group ID identifies the RAG group on that partner. The group algorithm identifies the particular algorithm to be used for selecting which specific interface a specific packet should use. A number of potential algorithms are identified in the current art including in the references included herein. Some algorithms may require a specific number of hardware address entries. For instance, a simple algorithm might just use the last two bits of the message originating protocol address. This would suggest the need for four hardware address entries. The RAG protocols allow the receiver to specify what hardware address goes in each of the entries and it can use the same hardware address more than once. It also can tune these values on a partner-by-partner basis. The receiver being able to select the group algorithm to use (assuming the sender supports it) and select what hardware addresses go in each slot, gives the receiver a great deal of control over the load balancing between interfaces. The receiver can also dynamically change these values.

FIG. 19B depicts the group table. The system ID and Group ID are the same as in FIG. 19A. The group table has a separate entry for each slot in the receive group, each slot having its own unique interface key value. For instance in the previous example there could be four entries in the group table with interface key values of 0 through 3. What ever the value is of the last two bits of the protocol address determines what interface key value will be used. As was noted before, the same hardware address can be used for more than one interface key.

FIGS. 19C through 26 depict flow diagrams for the messages used to establish RAG receive load balancing.

Figure 19C:
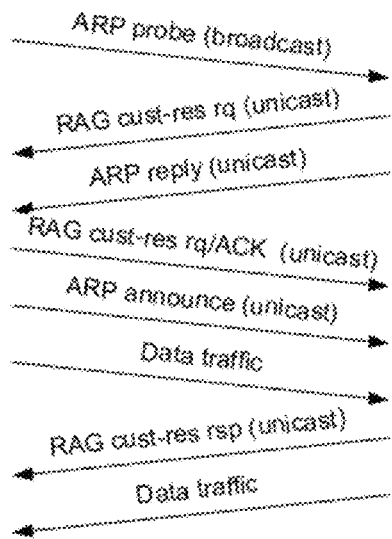

FIG. 19C is a flow diagram of the address resolution flows between two RAGR systems. For the flows to function properly, the system A must control what systems resolve its protocol address. Therefore when System A needs to resolve the protocol address for system B, system A broadcasts an ARP probe rather than ARP request. When a RAGR group receives an ARP request or an ARP probe it first sends a directed or unicast RAG cust-res rq (RAG custom resolution request packet) as depicted in FIG. 57. This informs the partner system that the cust-res rq sender wants to receive load balanced traffic over the interfaces included in the request (if the partner system supports RAG). System B indicates this by sending the cust-res rq. In case the partner does not support RAG, system B immediately follows the cust-res rq with an ARP reply sent directly to system A. However, in this case, system A does support RAG and also wants to receive load balanced traffic so system A also sends a cut-res rq to system B indicating the hardware addresses it wants traffic load balanced over and also includes a cust-res ACK as depicted in FIG. 54 for the cust-res rq system B sent to system A. System A also follows this cust-res rq up with an ARP announce in case system B only supports receiving on a RAG group and not sending to a RAG group. Since system B does support sending to a RAG group, it sends a cust-res rsp as depicted in FIG. 58 directly to system A to acknowledge the cust-res rq system A sent to system B. Now both systems are receive load balancing. Also of note is that both systems can also be send load balancing out their interfaces.

Figure 19D:
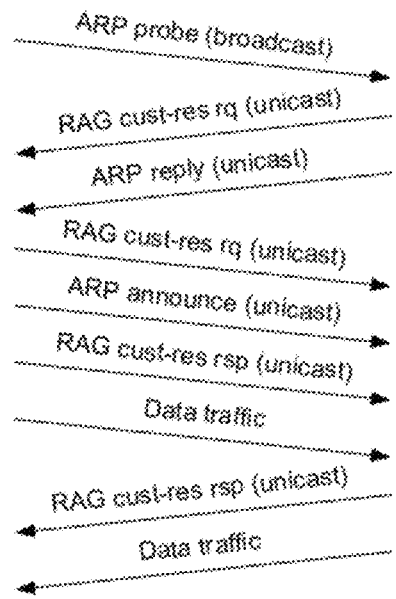

FIG. 19D is a flow diagram of an alternate set of flows for address resolution between two RAGR systems. If system A needs to change any parameters from the cust-res request it received form system B it cannot simply include the cust-res ACK TLV (Type/Length/Value) parameter on the cust-res rq it sends. Instead system A must send a cust-res rsp separate from the cust-res rq it sends.

Although it is not depicted, if a system sending a cust-res rq does not receive an ACK, it retries a set number of times before it gives up.

Figure 20:
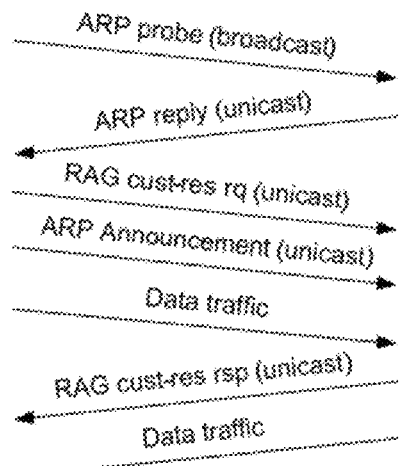

FIG. 20 is a flow diagram of the address resolution flows between a RAGR and a RAGS system. In this case when system A sends the ARP probe, since system B does not support receiving RAG load balanced traffic, it does not send a cust-res request but simply sends the ARP reply. Since system A does support receiving RAG load balanced traffic, after if receives the ARP reply from system B it sends a cust-res rq directly to system B and then follows this with an ARP Announcement sent directly to system B with one of its hardware addresses included (whatever hardware address system A wants system B sending to if system B does not support RAG). Since System B does support sending to a RAG group, system B sends a cust-res rsp directly to system A acknowledging the cust-res rq. System B now sends RAG load balanced traffic to system A.

Figure 21:
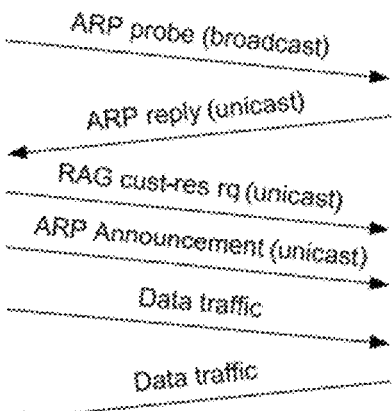

FIG. 21 is a flow diagram of the address resolution flows between a RAGR and a non RAG system. In this case when system A sends the ARP probe, since system B does not support receiving RAG load balanced traffic, it does not send a cust-res request but simply sends the ARP reply. Since system A does support receiving RAG load balanced traffic, after if receives the ARP reply from system B it sends a cust-res rq directly to system B and then follows this with an ARP Announcement sent directly to system B with one of its hardware addresses included (whatever hardware address system A wants system B sending to if system B does not support RAG). Since System B does not support sending to a RAG group, system B does not understand the cust-res rq and ignores it. When it receives the ARP announcement it caches the hardware address in it and sends to system A using that hardware address. Although not depicted, System A will continue to send cust-res rqs a set number of times before giving up.

Figure 22:
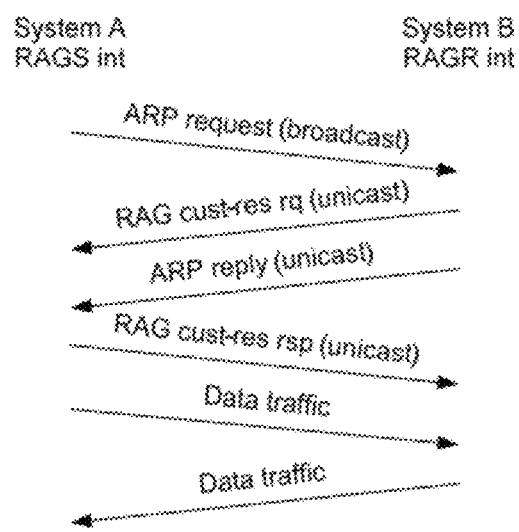

FIG. 22 is a flow diagram of the address resolution flows between a RAGS and a RAGR system. When a system that only supports sending to a RAG group but not receiving on a RAG group is initiating a connection, it is not concerned with masking its protocol address to hardware address mapping from other systems (unless it is doing host granular load balancing of course) so it broadcasts an ARP request. Since system B supports receiving on a RAG group it first sends a cust-res rq to system A and then sends the ARP reply to system A. Since system A does support sending to a RAG group it sends a cust-res rsp to system B to acknowledge the cust-res rq sent by system B.

Figure 23:
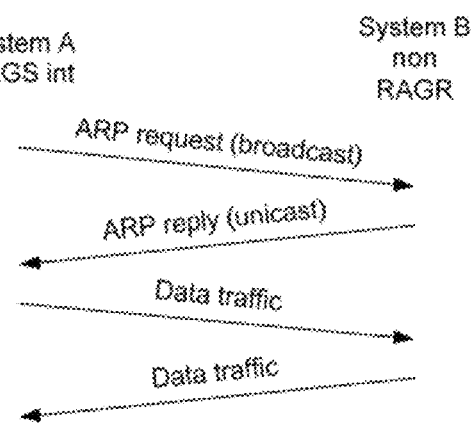

FIG. 23 is a flow diagram of the address resolution flows between a RAGS and a non RAG system. System A is a RAGS system so does not support receiving to a RAG group. System B is either a RAGS system or a non RAG system so also does not support receiving to a RAG group. Therefore, system A simply broadcasts an ARP request and system B sends an ARP reply directly to System A.

Figure 24:
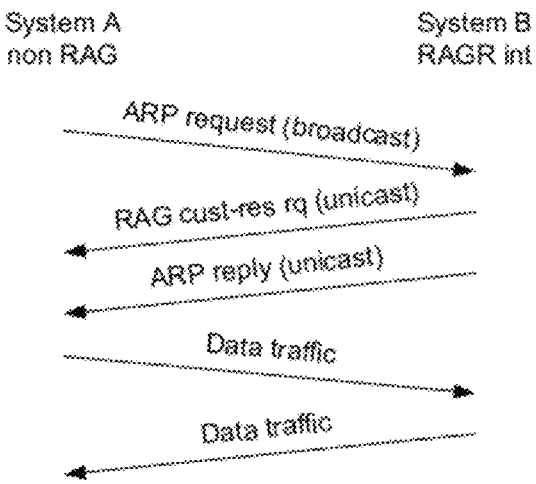

FIG. 24 is a flow diagram of the address resolution flows between a non RAG and a RAGR system. In this example, system A broadcasts an ARP request. Since system B supports receiving to a RAG group it first sends a cust-res rq to system A and then sends an ARP reply to system A. System A ignores the cust-res rq and caches the resolution in the ARP reply. System B will retry the cust-res rq a set number of times and then give up.

Figure 25:
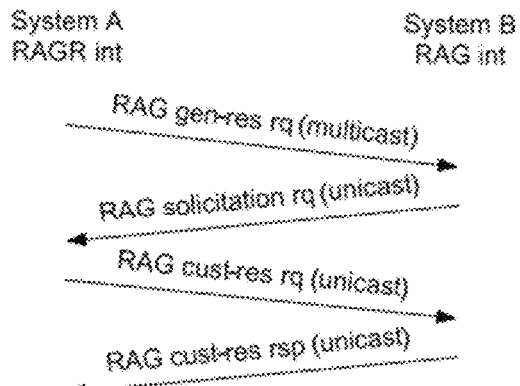

FIG. 25 is a flow diagram of a multicast update called a gen-res rq (general resolution request). This can be triggered by the state of an interface in a RAG group changing or when the system first comes up (to clear up any old cache entries that might be out there). All of the RAG capable systems on the broadcast domain will receive the gen-res request and temporarily adopt the generic load balancing parameters included in the gen-res rq. However, when a RAG system that has a cache entry for a system that sends a gen-res rq receives the gen-res rq, it will send out a solicitation rq in short order. There is a variable delay before system B sends out the solicitation request in order to keep from having all of the RAG systems sending a solicitation request to system A at the same time. The system receiving the gen-res rq should randomize the delay between a minimum delay interval and a maximum delay interval. The solicitation request in response to a gen-res rq will include the sequence number of the gen-res rq in an ACK TLV and will include what the cache entry values had been before the gen-res rq. System A then sends a cust-res rq directly to system B to give it the custom load balancing System A should be using. System A then sends a cust-res rsp back to system A to acknowledge the cust-res rq.

Solicitation requests are also used to refresh RAG group entries in the cache. When an ARP cache entry that has an associated group is in the refresh window, the system will send a solicitation request to the partner system. In this case, the solicitation request will not include an ACK TLV and the values in the solicitation rq will reflect the values currently in the sending system's cache. The solicitation rq will cause the partner system to generate a cust-res rq refreshing the ARP cache.

Figure 26:
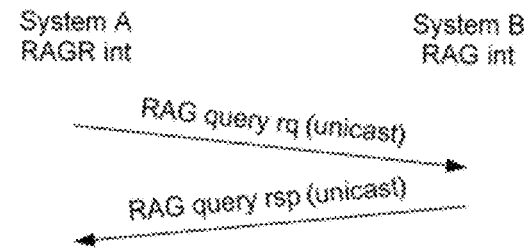

It is assumed that a system supporting receiving load balanced traffic is not necessarily keeping track of all the parameters it has sent to each individual partner. Therefore, RAG supports a query rq that request the partner system to return the values it has in its cache in a query response. FIG. 26 is a flow diagram of system A sending a query request to system B and system B sending a query rsp back to system A with the values system B has in its cache.

FIGS. 27 through 44 depict more detailed process information for the processes already describe to some degree during the description of the flow diagrams.

Figure 27:
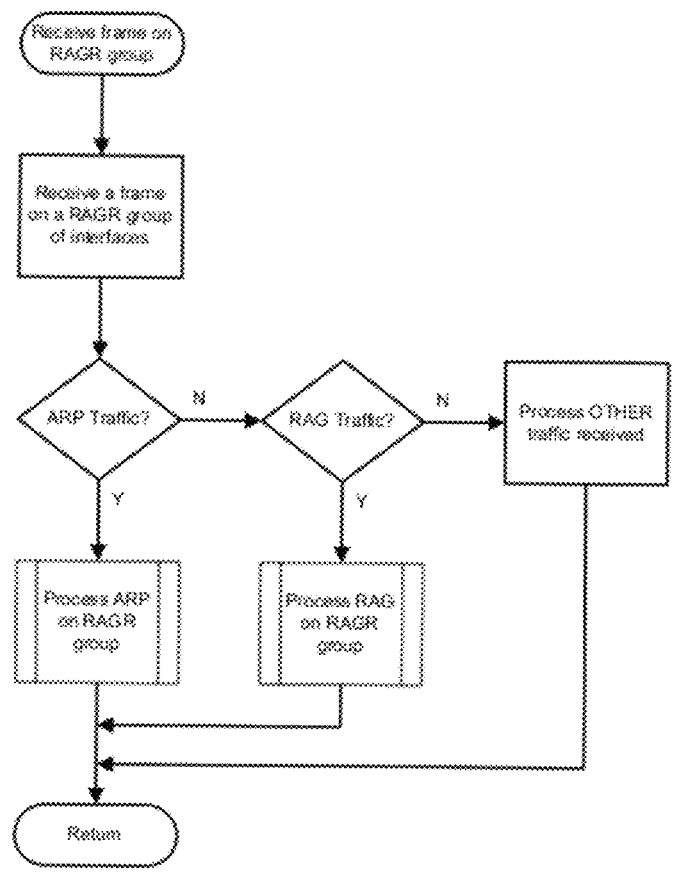

FIG. 27 is an illustration of the process of the current invention when receiving traffic on an interface that is part of a RAGR group. It identifies if the received frame is ARP traffic to be processed, RAG traffic to be processed, or other traffic to be passed on.

Figure 28:
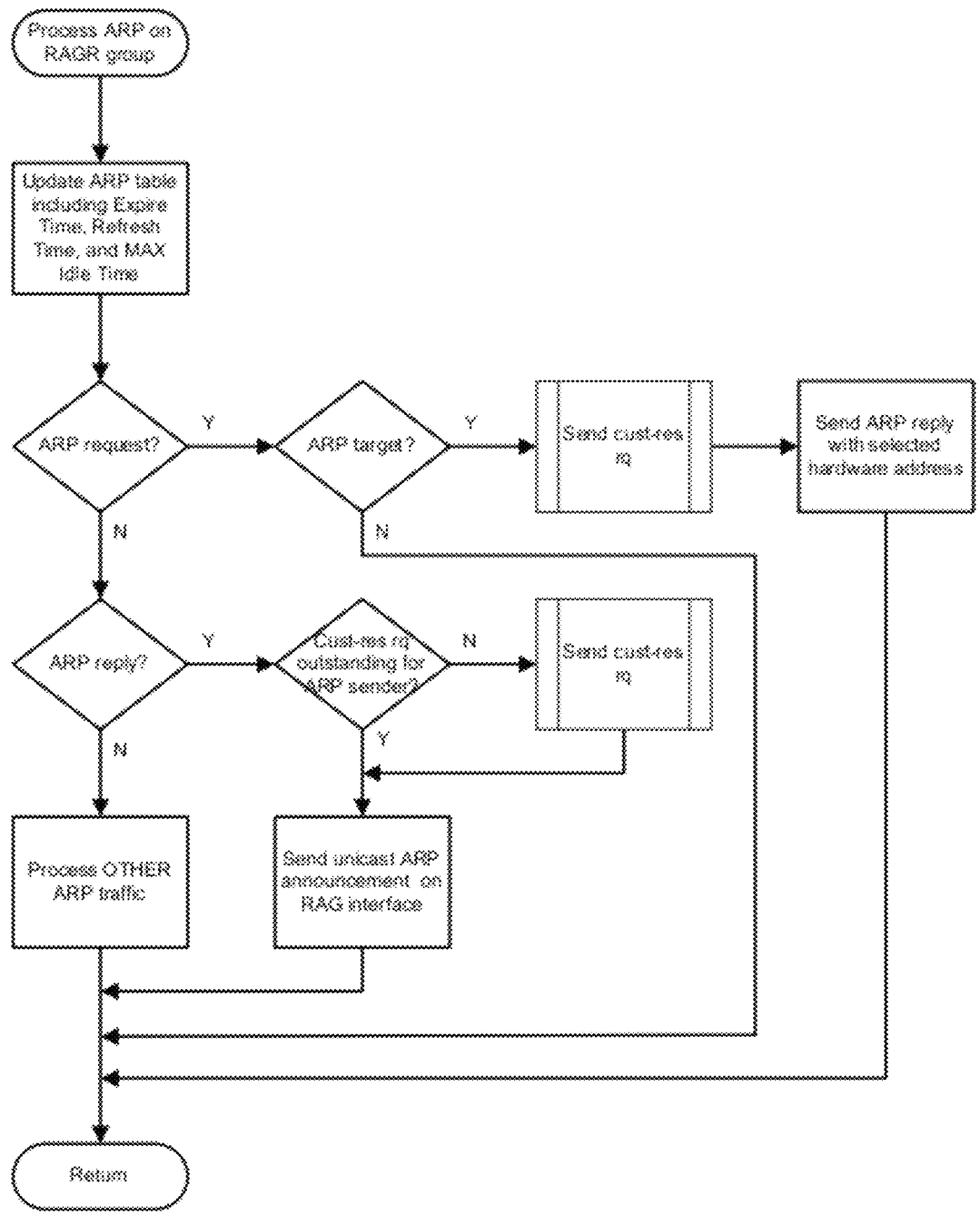

If the frame was ARP traffic, FIG. 28 illustrates the processing of ARP traffic received on a RAGR group. If it is an ARP request where this system is the target then the system sends a cust-res rq and then sends an ARP reply. If the frame is an ARP reply and there is not an outstanding cust-res rq for this partner protocol address then send a cust-res rq and then send a unicast ARP announcement in reply. If there is already an outstanding cust-res rq then just send the unicast ARP announcement in reply. If it is neither an ARP request nor an ARP reply then hand it off for some other process to handle.

Figure 29:
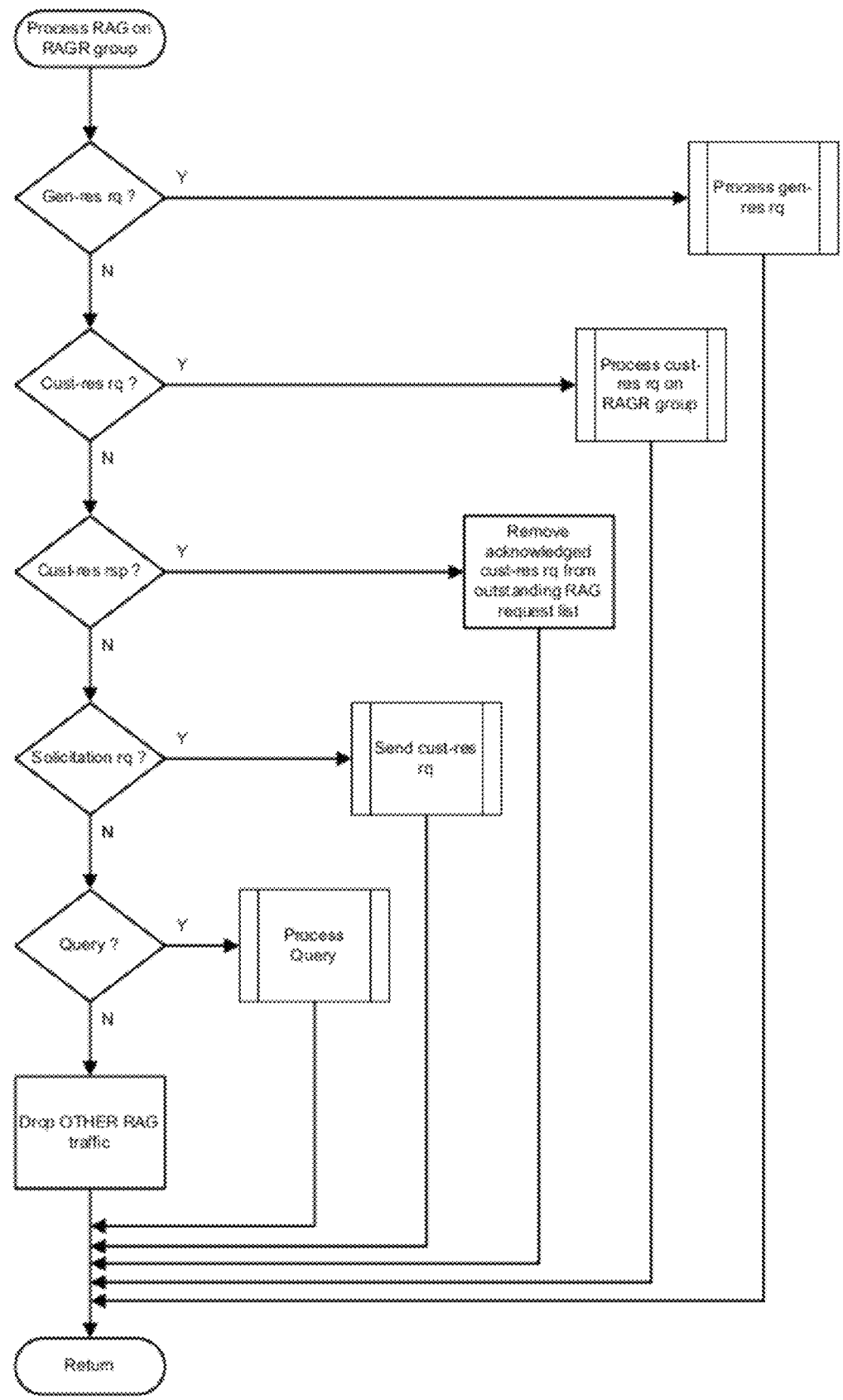

FIG. 29 is an illustration of the process of the current invention for processing RAG traffic received on a RAGR group. If the RAG frame is a cust-res rsp then remove the associated cust-res rq from the list of outstanding requests. If it is a gen-res rq, cust-res rq, solicitation rq, or a query then process these requests according to their process flow charts. If it was not one of these then drop it.

Figure 30:
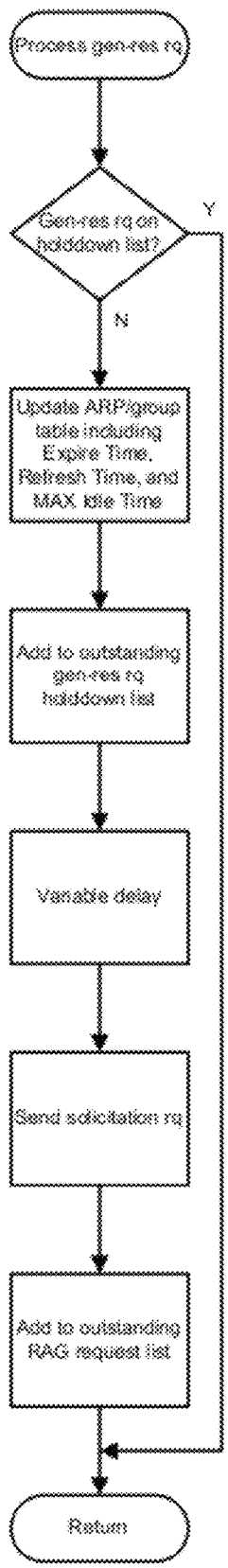

FIG. 30 is an illustration of the process of the current invention for processing a gen-res request received on a RAGR group; The gen-res rq processing includes putting the request on a hold down list so that a retransmission of a gen-res rq will not be processed again. After the system has send a solicitation rq and received a cust-res rq a retransmission of the gen-res should not wipe it out. If an new gen-res is generated, it will have a new sequence number. The first time a particular gen-res request is received, the system will update the ARP cache and group table with the values from the gen-res rq and will then send out the solicitation rq after a variable delay. The solicitation rq will be retransmitted a set number of time if a cust-res rq is not received with a solicitation ACK in it acknowledging the solicitation rq.

Figure 31:
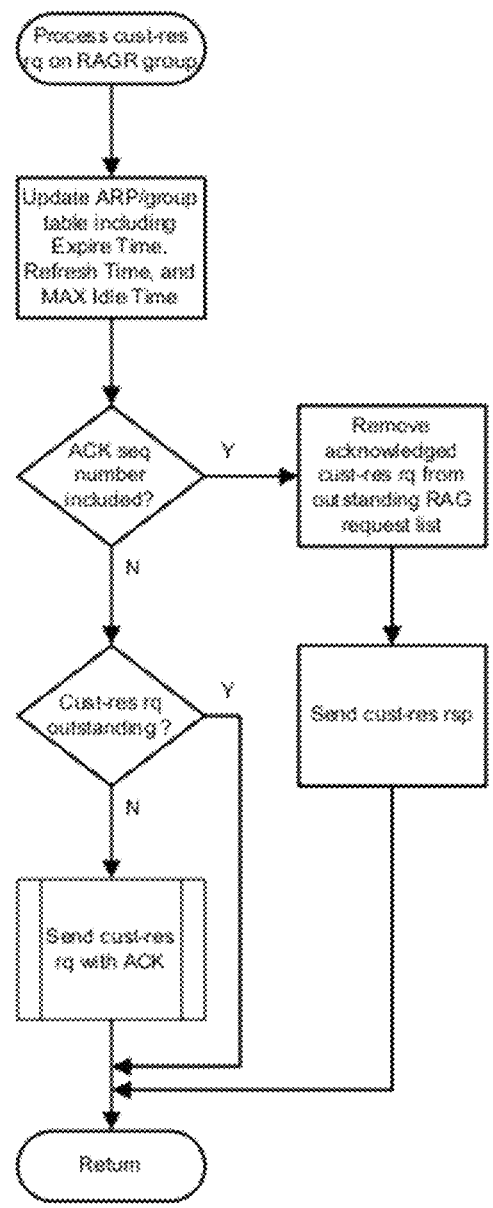

FIG. 31 is an illustration of the process of the current invention for processing a cust-res request received on a RAGR group. The cust-res rq will cause the ARP/group cache to be updated. If the cust-res rq included a cust-res ACK then the request that is being ACKed will be removed from the outstanding request list and a cust-res rsp will be sent to acknowledge the cust-res rq just received. If a cust-res ACK was not included in the cust-res rq and this system does not have an outstanding cust-res rq for the partner protocol address then a cust-res rq with a cust-res ACK for the received cust-res request will be sent.

Figure 32:
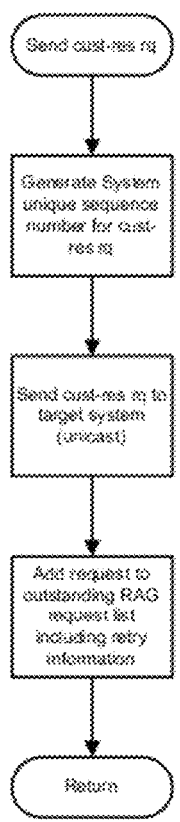

FIG. 32 is an illustration of the process to generate and send a cust-res rq and add the sequence number to the outstanding request list.

Figure 33:
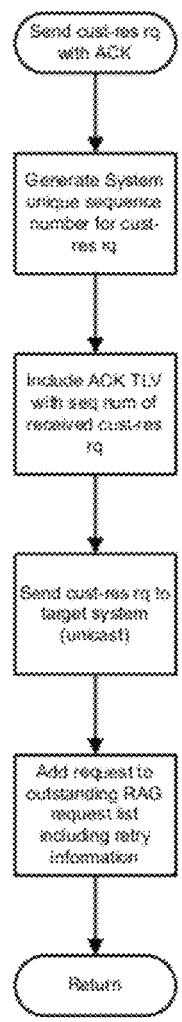

FIG. 33 is the same as FIG. 32 except that a cust-res ACK is also added for a received cust-rest request.

Figure 34:
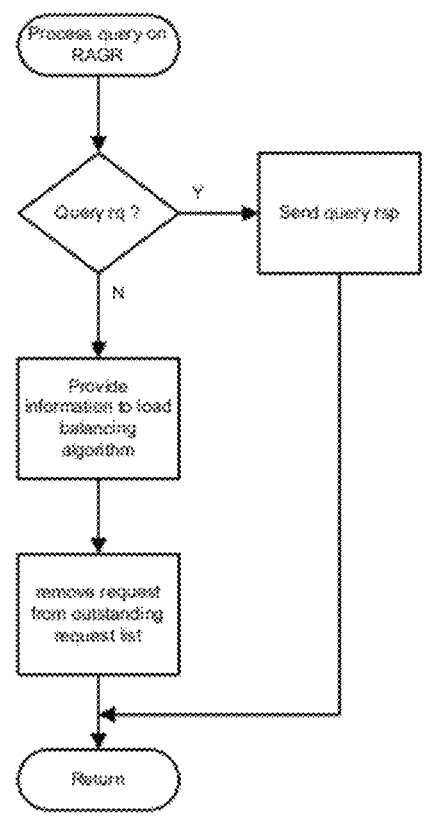
FIG. 34 is an illustration of the process of the current invention for processing a query received on a RAGR group.

FIG. 34 is an illustration of the process of the current invention for processing a query received on a RAGR group. If a query request was received then a query response is generated from the values in the ARP cache and sent in reply. If a query response was received then the information in the request is passed to the load balancing process and the associated query request is removed for the outstanding request list.

Figure 35:
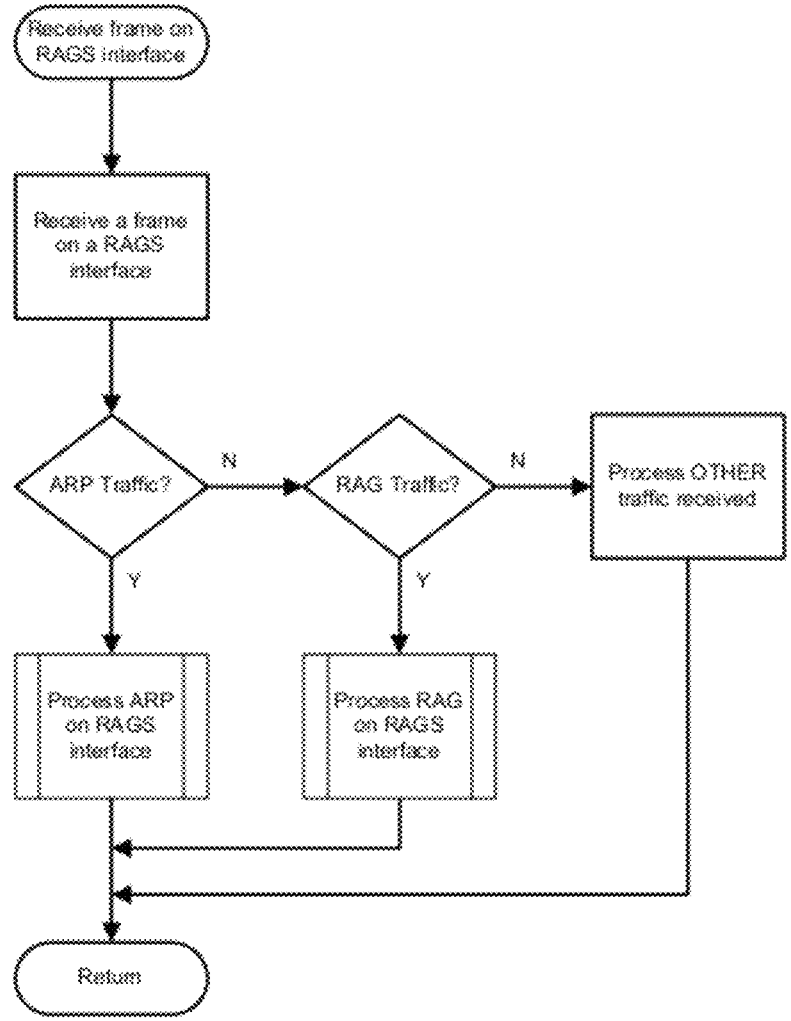
FIG. 35 is an illustration of the process of the current invention for receiving traffic on a RAGS capable interface.

FIG. 35 is an illustration of the process of the current invention for receiving traffic on a RAGS capable interface. The process handles ARP traffic or RAG traffic. Otherwise it passes the traffic on to other processes.

Figure 36:
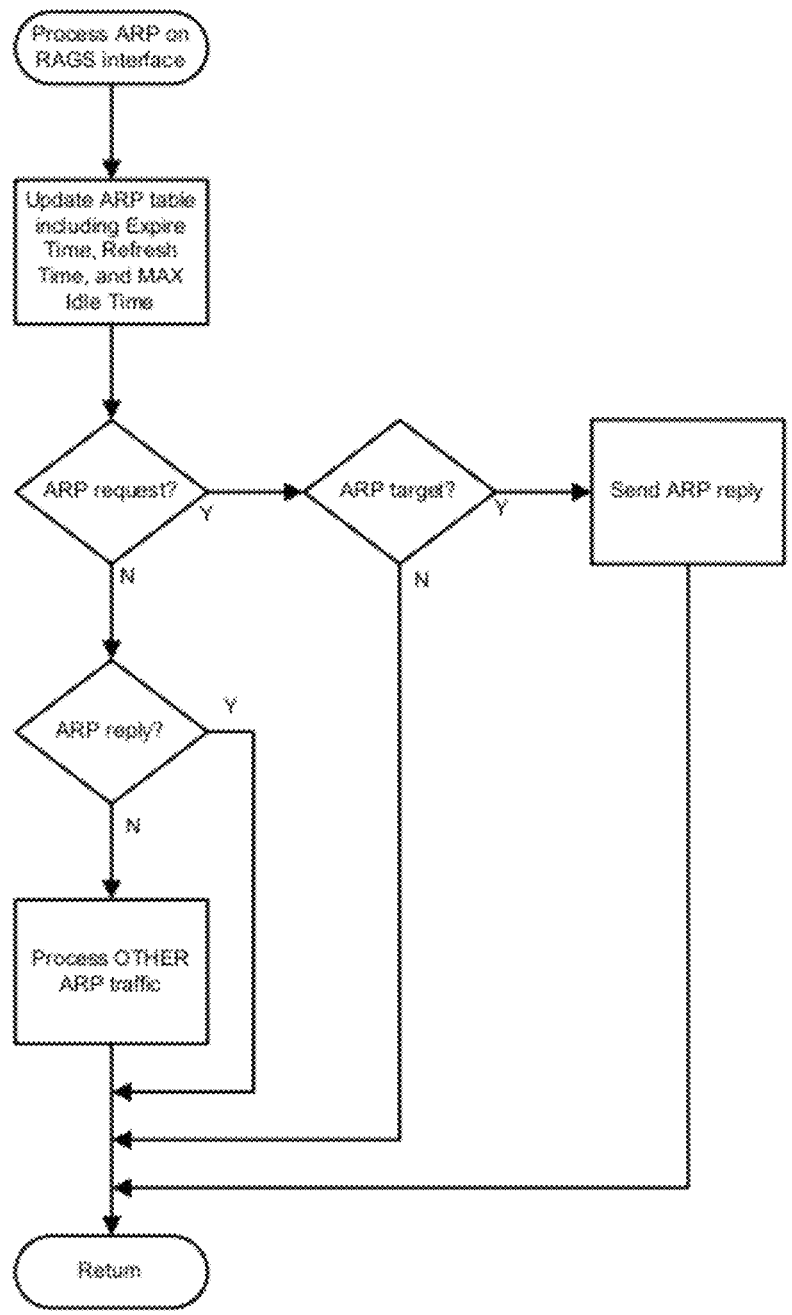
FIG. 36 is an illustration of the process of the current invention for processing ARP traffic received on a RAGS capable interface.

FIG. 36 is an illustration of the process of the current invention for processing ARP traffic received on a RAGS capable interface. The ARP cache is updated with the information from the ARP frame. If the system is the target of an ARP frame then it sends an ARP reply. If it is not an ARP request for an ARP reply then it is handed off to other processes to handle.

Figure 37:
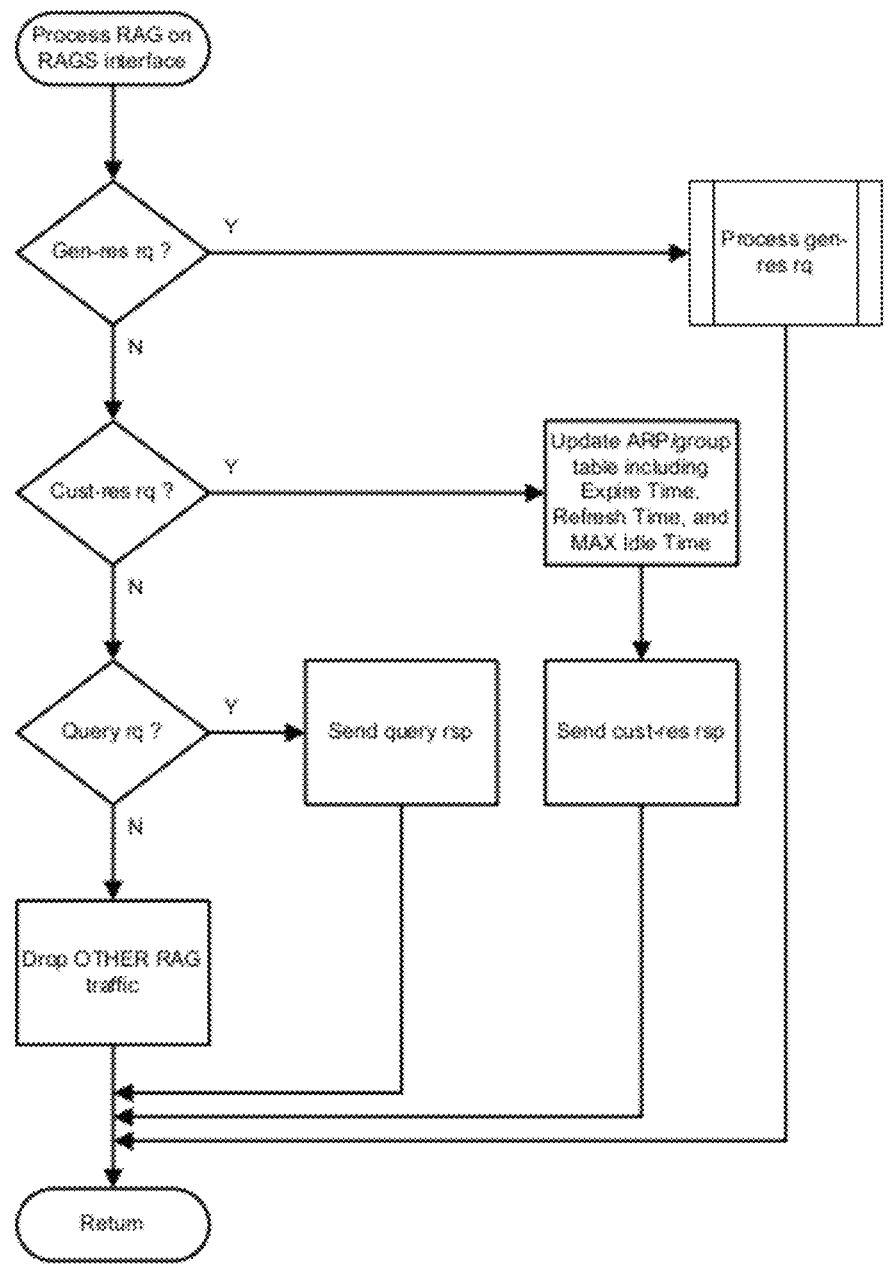
FIG. 37 is an illustration of the process of the current invention for processing RAG traffic received on a RAGS capable interface.

FIG. 37 is an illustration of the process of the current invention for processing RAG traffic received on a RAGS capable interface. If this is a gen-res rq then it is processed according to FIG. 30. If it is a cust-res rq then update the ARP/group cache and send a cust-res rsp to acknowledge the cust-res rq. If this is a query rq then generate a query rsp with the information from the cache and send the query rsp in reply. Drop any other RAG traffic.

Figure 38:
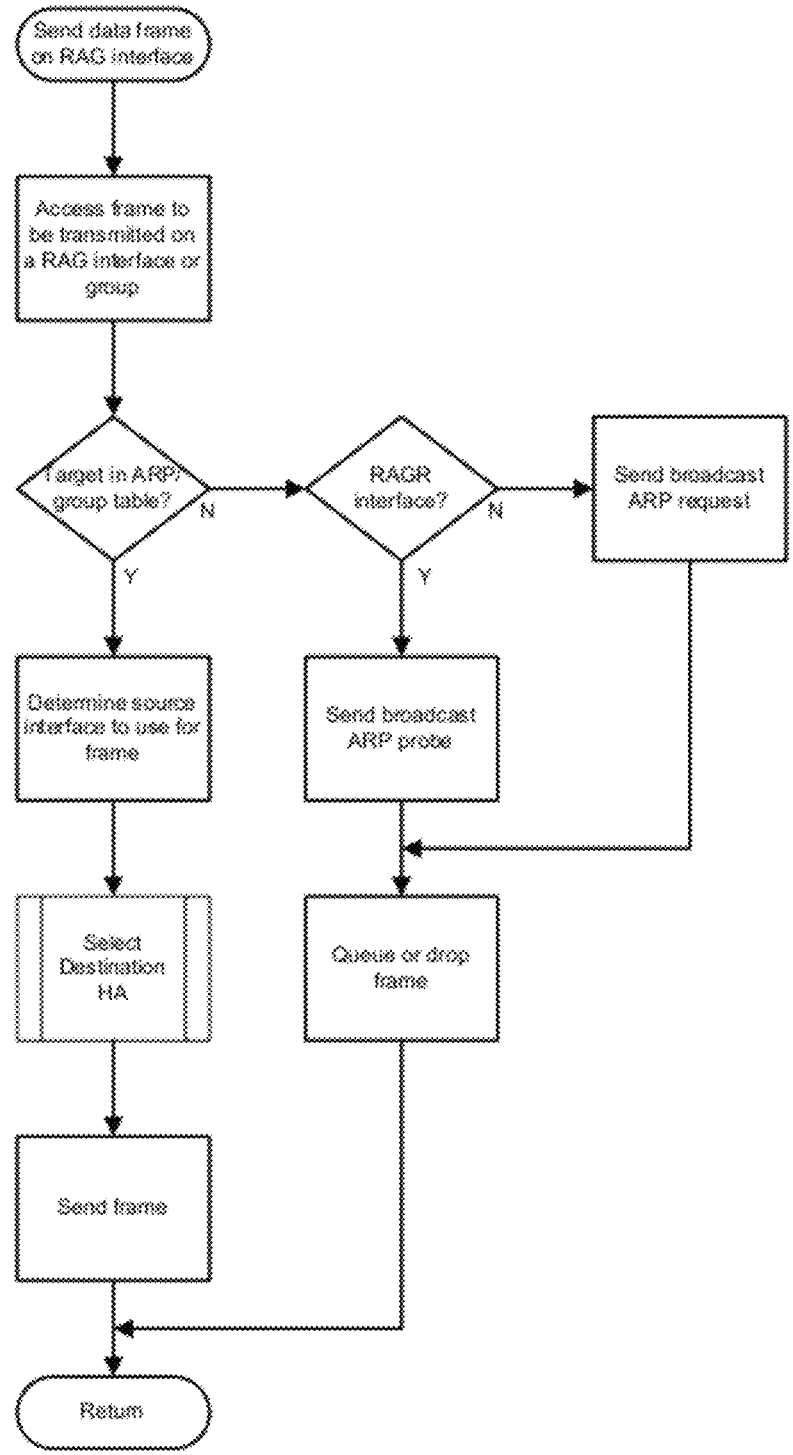
FIG. 38 is an illustration of the process of the current invention for sending traffic on a RAG interface or group.

FIG. 38 is an illustration of the process of the current invention for sending traffic on a RAG interface or group. When sending a frame, if the destination is not in the ARP table and it is not to be sent out a RAG interface then handle it according to prior art. If it is a RAG interface then broadcast an ARP probe instead of an ARP request to keep control over the address resolution process. If the destination is in the ARP/group table then select the destination hardware address and send the frame. This system may also support send load balancing in which case the outbound interface will need to be selected.

Figure 39:
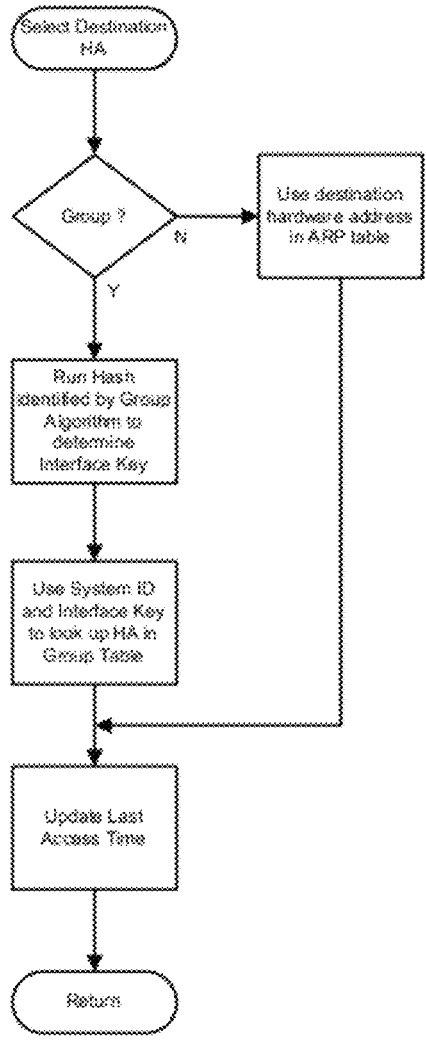
FIG. 39 is an illustration of the process of the current invention for selecting the destination hardware address when sending to a RAGR group.

FIG. 39 is an illustration of the process of the current invention for selecting the destination hardware address when sending to a RAGR group. If the group Boolean entry is true in the ARP table entry then use the group algorithm specified to determine the interface key value. Then use the system ID, group ID and Interface Key value to look up the hardware address in the group table. If the group Boolean is not true then use the hardware address specified in the ARP table entry. In either case, update the last accessed time field in the ARP cache entry.

Figure 40:
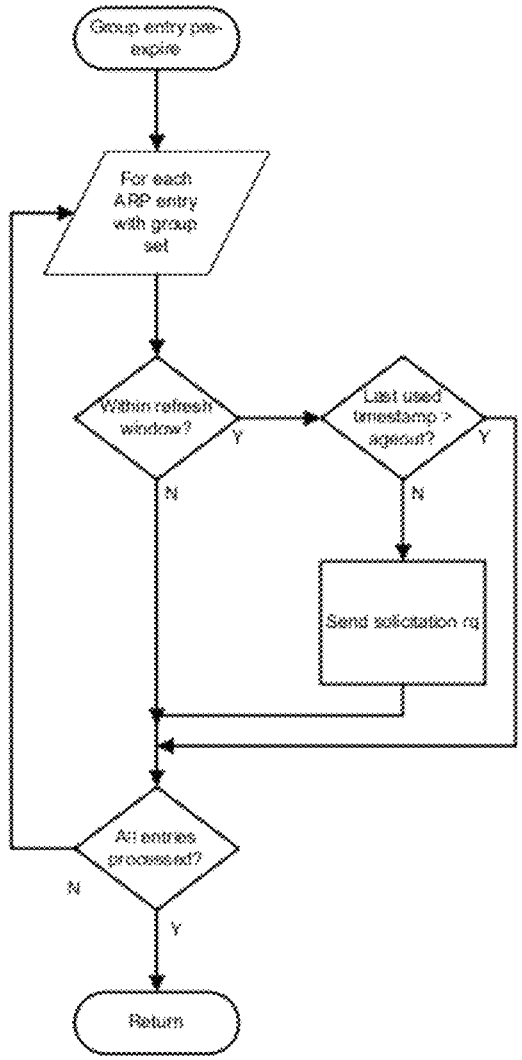
FIG. 40 is an illustration of the process of the current invention for refreshing ARP cache entries before they expire.

FIG. 40 is an illustration of the process of the current invention for refreshing ARP cache entries before they expire. For each entry in the ARP cache for which the group Boolean is true and the state is valid, if the current time is greater than the refresh time and the time since the last access time is less than the max idle time then send a solicitation rq.

Figure 41:
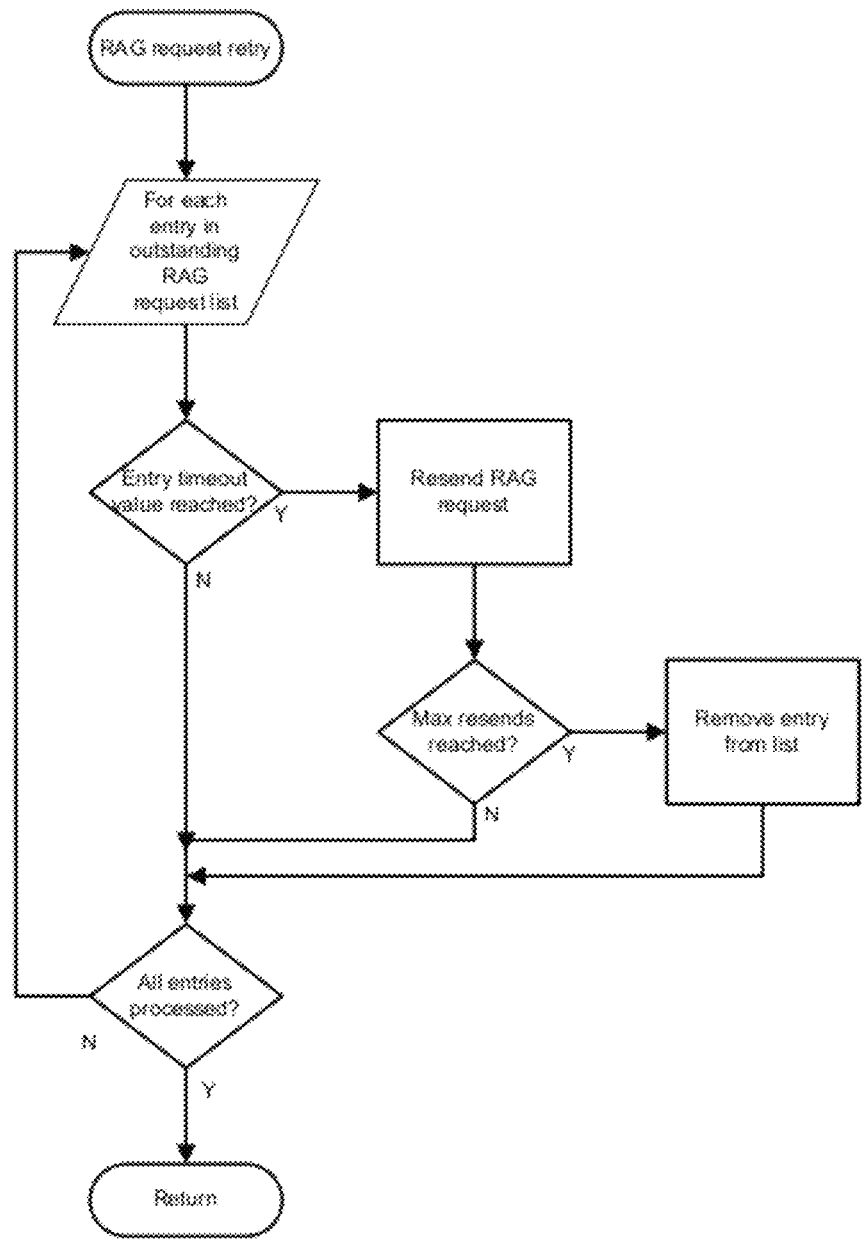
FIG. 41 is an illustration of the process of the current invention for retrying RAG request that are not acknowledged.

FIG. 41 is an illustration of the process of the current invention for retrying RAG request that are not acknowledged. For each item on the request retry list if it has timed out since the last retry resend the request. If the request has been sent the maximum number of times then remove it from the list.

FIG. 42 is an illustration of the process of the current invention when an interface in a RAGR group changes status. When an interface that is part of a RAG group changes status and gen-res rq will be sent to update all the partners not to use an interface that is down and do cause the partners to solicit cust-res requests to allow the system to re-load balance where the partner systems are sending traffic. The gen-res rq is added to the outstanding request list so that it will be sent a set number of times. This should not happen often. Also, since there might be non-RAG systems that have a bad interface cached and we don't know what systems might be using such an interface the system can optionally send unicast ARP announcement to every non-RAG system in the ARP table for that broadcast domain to reset there cache values. The system should not send a broadcast ARP announcement.

FIG. 43 is an illustration of the process of the current invention for ignoring repeated gen-res requests after the first one is received.

FIG. 44 is an illustration of the process of the current invention for sending a query request. The request for this would be generated by a load balancing process that is outside the scope of this disclosure.

FIGS. 45 through 55 describe the type/length/value (TLV) parameters that are used in conjunction with the RAG messages. Each TLV has a parameter identifier, a length field that identifies the length of the value part of the TLV in bytes and then a value. What the value represents is determined by the parameter type identifier. Most of the TLV parameters are very straight forward.

FIG. 45 is a system identifier. This identifier should uniquely identify the system within the network. One of the systems burned in MAC addresses might be a good candidate to use for the system identifier.

FIG. 46, Hardware Type, and FIG. 47, Protocol Type, have the same meaning as they do in ARP as described in RFC826.

FIG. 48 is the group-id and should uniquely identify a group within a system.

FIG. 49 is the requested group algorithm. This indicates what the wants to use for a group algorithm.

FIG. 50 is the set group algorithm. This indicates what the sender has set for the group algorithm.

FIG. 51 is the cache time TLV. This indicates what the request would like the sender to use for a cache expire time. But the sender does not have to honor the request.

FIG. 52 is the Receiver protocol addresses. The number of addresses should be one. For IPv4 the length of each address is 4.

FIG. 53 is the receiver hardware addresses. Here the number of addresses can be more than one. For IEEE 802 MAC addresses the length of each hardware address should be 6.

FIG. 54 is the cus-res ACK that would carry the sequence number of a cus-res rq that is being acknowledged.

FIG. 55 is the solicitation ACK that would carry the sequence number of a solicitation rq that is being acknowledged.

FIGS. 56 through 61 depict the RAG messages that are used to establish and maintain RAG receive load balancing. There are a few formats that can be selected to carry the RAG frames. Some options include assigning RAG messages their own Ether type and their own multicast addresses; use an LLC2 header and assign them their own multicast addresses;

use of LLC2 with SNAP headers and assign them their own multicast addresses; or use the IP ethertype with an identifying protocol field and use an IP multicast address (this would limit RAG to IP only). The preferred exemplary embodiment is the first choice to use their own Ether type and their own multicast addresses. All the RAG messages have an RRI bit indicating if this is a request for a response, an opcode identifying the type of RAG message some reserved flags and a length indicating the length of all the TLV parameters. A system generating a request generates the sequence number. A response carries the same sequence number as the request. For each REC message some TLV parameters are mandatory, marked with an (m) and some are optional, marked with an (o).

FIG. 56 is an illustration of a gen-res request. This is the only RAG message that is sent using the multicast address. System ID identifies the sending system, group ID identifies the group being updated, receiver protocol addresses identifies the protocol address associated with this group ID, receiver hardware addresses lists the hardware addresses associated with the group, hardware type and protocol type default to Ethernet and IPv4 if not included, Requested Group Algorithm identifies the group algorithm the generator of the gen-res rq would like used, and cache time identifies how long the request generator would like to see the resolution information cached. For a gen-res request the cache time might be set short since the partner systems should be generating solicitation request in response.

FIG. 57 is an illustration of a cust-res request. System ID identifies the sending system, group ID identifies the group being updated, receiver protocol addresses identifies the protocol address associated with this group ID, receiver hardware addresses lists the hardware addresses associated with the group, hardware type and protocol type default to Ethernet and IPv4 if not included, Requested Group Algorithm identifies the group algorithm the generator of the request would like used, cache time identifies how long the request generator would like to see the resolution information cached, cust-res ACK if present includes the sequence number of a cust-res rq the system received and is acknowledging, and solicitation ACK if present includes the sequence number of a solicitation rq the system received and is acknowledging.

FIG. 58 is an illustration of a cust-res response. System ID, group ID, receiver protocol addresses, hardware type, protocol type, and Requested Group Algorithm are the same values that were included in the cust-res rq. The receive hardware addresses contains the values actually placed in the group table by the response sender. If Set group algorithm is not present it defaults to the same value as the request group algorithm. If it is present it indicates the group algorithm the sender is actually using.

FIG. 59 is an illustration of a solicitation request. System ID, group ID, receiver protocol addresses, receiver hardware addresses, and set group algorithm all identify the values currently in the cache or that were in the cache before a gen-res rq.

FIG. 60 is an illustration of a query request. System ID, group ID, and receiver protocol addresses identify the group entries to look up.

FIG. 61 is an illustration of a query response. System ID, group ID, receiver protocol addresses, receiver hardware addresses, and set group algorithm are all values that are in the ARP cache and group table.

FIG. 62 is an illustration of the network environment with a gateway using NAT to force off-domain traffic through it. In order to force traffic from off the broadcast domain to use a system that supports RAG as the gateway to get to the broadcast domain, the gateway system NATs the RAGR systems IP address to an IP address that points to the gateway system. Then the gateway system translates the address and forwards the message on to the RAGR system using RAG.

While the description above refers to particular embodiments of the present invention, it will be understood that many modifications may be made without departing from the spirit thereof. The accompanying claims are intended to cover such modifications as would fall within the true scope and spirit of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of refreshing an address resolution protocol cache table, comprising the steps of:
    selecting a first entry in the address resolution protocol cache table;
    determining if the first entry is within a refresh window;
    if the first entry is within the refresh window, determining if less than a maximum idle time has elapsed since the first entry was accessed for address resolution; and
    if less than the maximum idle time has elapsed, transmitting a resolution request.

2. The method of claim 1, further including the step of:
    if not less than the maximum idle time has elapsed, not transmitting the resolution request.

3. The method of claim 1, further including the step of:
    determining if a current time is less than an expire time for the first entry; and
    if the current time is not less than the expire time for the first entry, removing the first entry from the address resolution protocol cache table.

4. The method of claim 1, further including the steps of:
    receiving an address resolution protocol response;
    determining an updated expire time for the first entry.

5. The method of claim 4, further including the step of:
    determining an updated refresh window.

6. The method of claim 5, further including updating the first entry in the address resolution protocol cache table with the updated refresh window and the updated expire time.

7. The method of claim 2, wherein the step of transmitting a resolution request involves the step of transmitting a directed resolution request.

* * * * *